Nov. 26, 1968     K. J. TONKIN ET AL     3,412,676
AUTOMATED CONTROL SYSTEM AND APPARATUS FOR OFFSET
DUPLICATING MACHINE
Filed July 7, 1965     12 Sheets-Sheet 4

INVENTORS
KENNETH J. TONKIN
JOHN P. GALLAGHER

BY Diggins and O'Boyle

ATTORNEYS

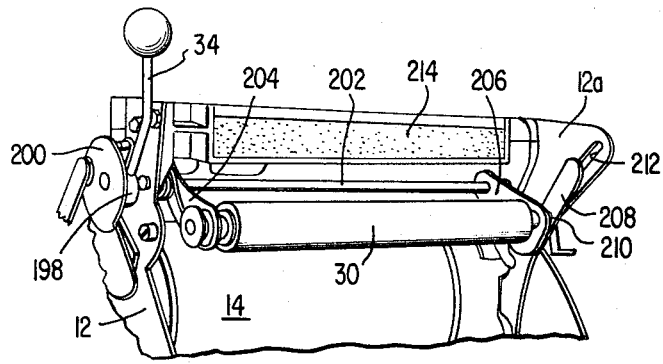
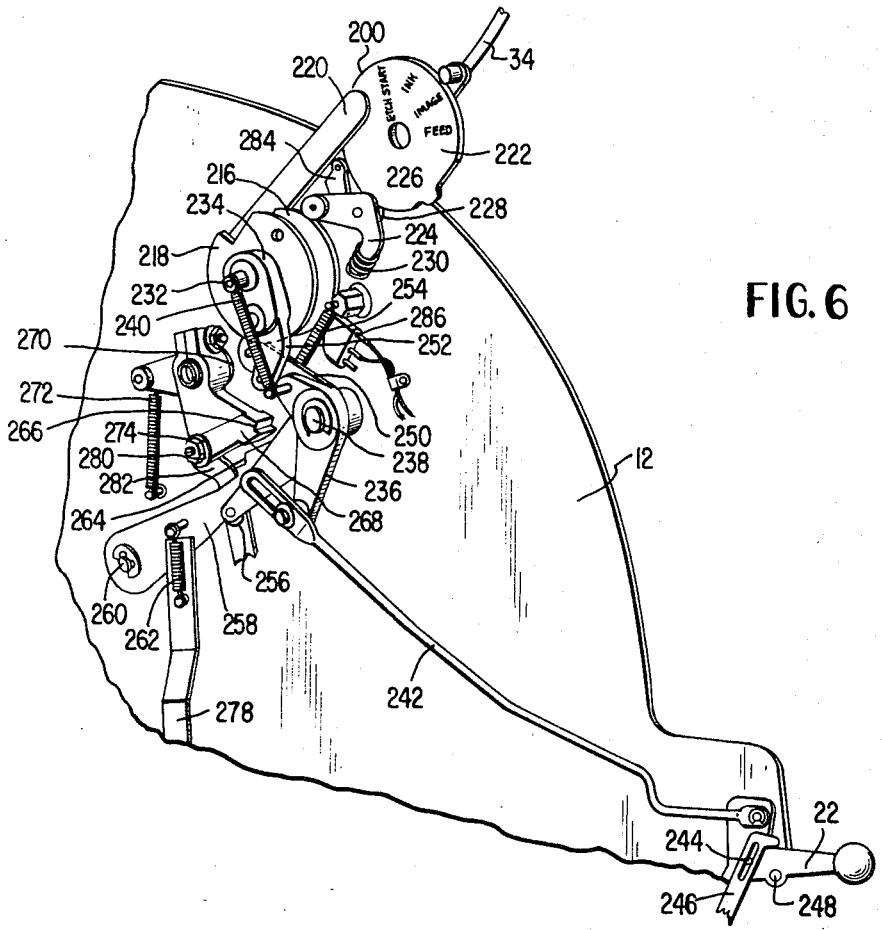

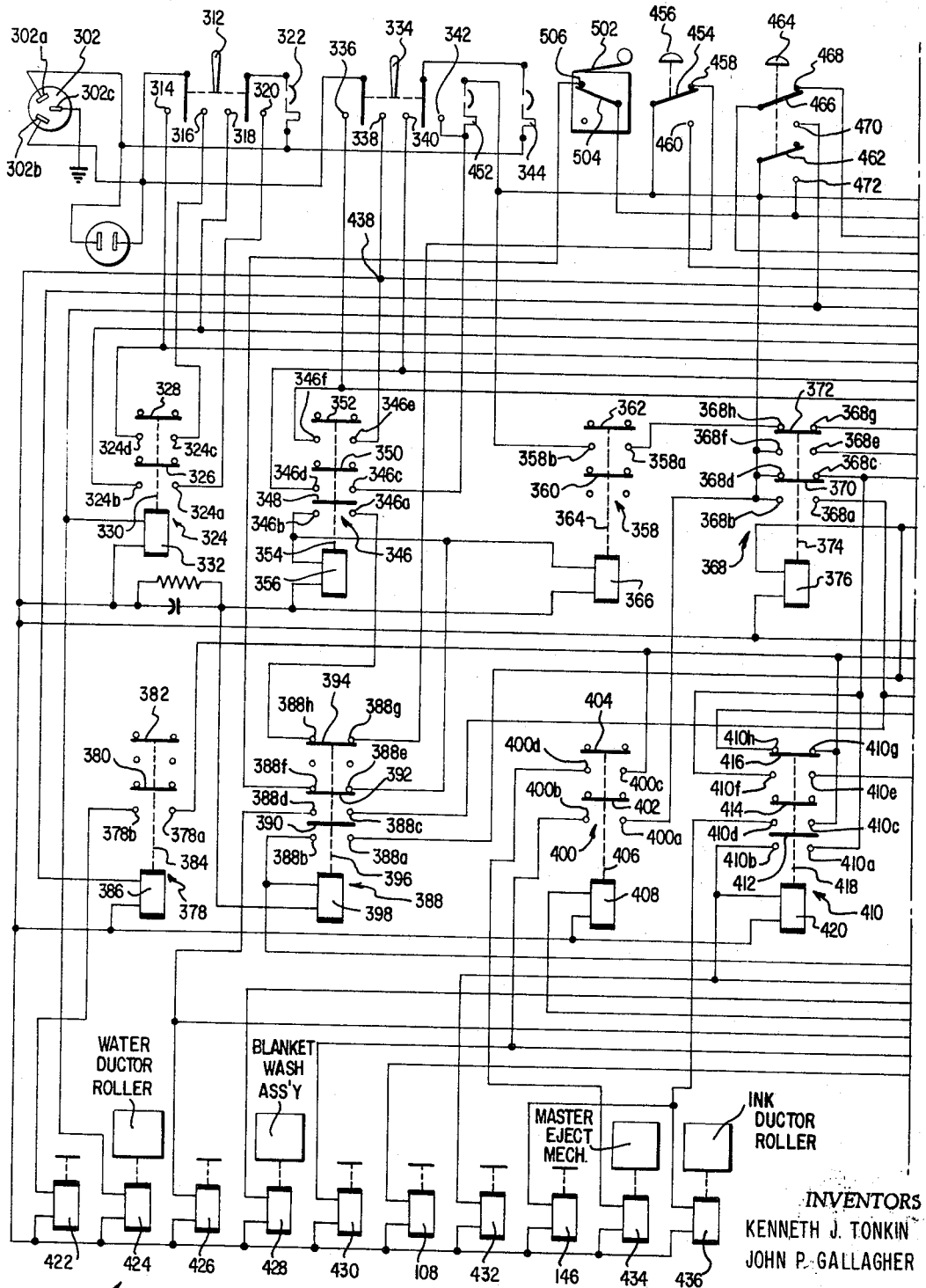

INVENTORS
KENNETH J. TONKIN
JOHN P. GALLAGHER

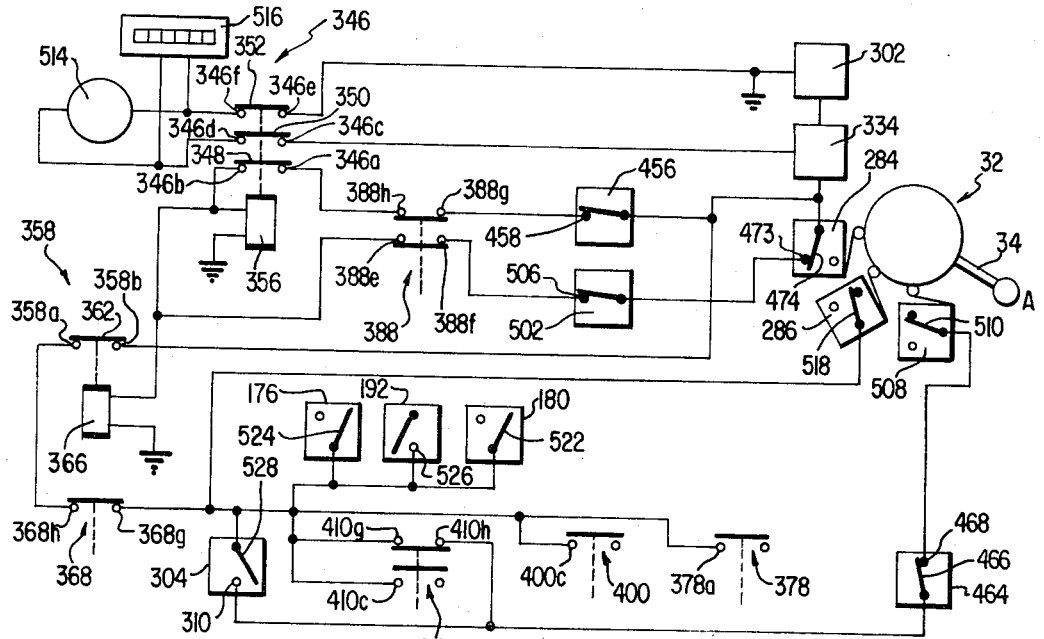
FIG. 8
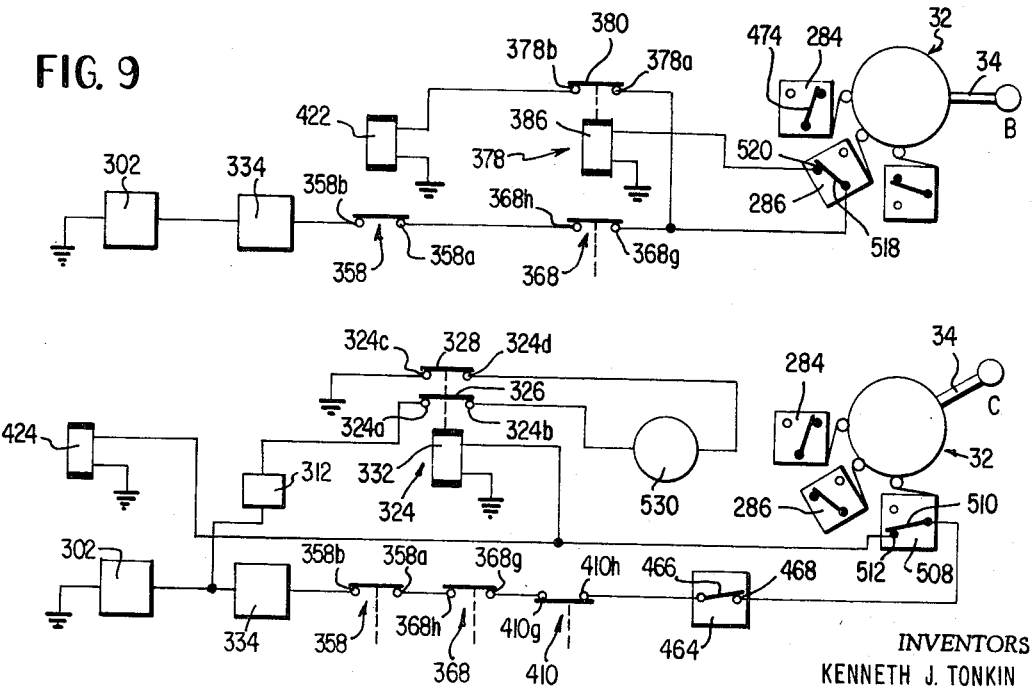
FIG. 9
FIG. 10
INVENTORS
KENNETH J. TONKIN
JOHN P. GALLAGHER
BY Diggins and O'Boyle
ATTORNEYS.

INVENTORS
KENNETH J. TONKIN
JOHN P. GALLAGHER

BY Diggins and O'Boyle

ATTORNEYS

Nov. 26, 1968    K. J. TONKIN ET AL    3,412,676
AUTOMATED CONTROL SYSTEM AND APPARATUS FOR OFFSET
DUPLICATING MACHINE
Filed July 7, 1965    12 Sheets-Sheet 10

INVENTORS
KENNETH J. TONKIN
JOHN P. GALLAGHER

BY   *Deggins and O'Boyle*

ATTORNEYS.

Nov. 26, 1968 K. J. TONKIN ET AL 3,412,676
AUTOMATED CONTROL SYSTEM AND APPARATUS FOR OFFSET
DUPLICATING MACHINE
Filed July 7, 1965 12 Sheets-Sheet 11

INVENTORS
KENNETH J. TONKIN
JOHN P. GALLAGHER

BY *Diggins and O'Boyle*

ATTORNEYS.

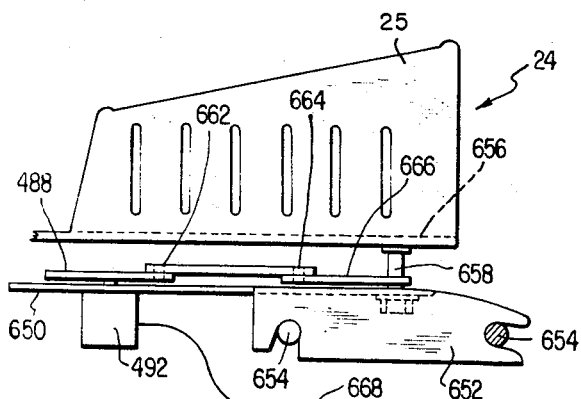
FIG. 18
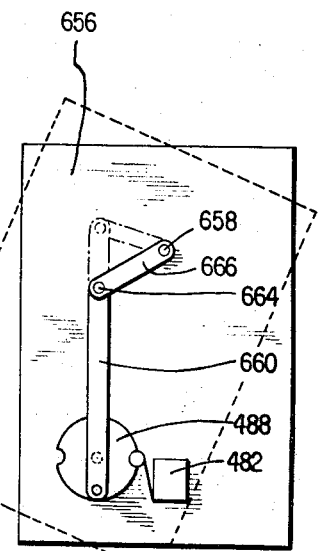
FIG. 19
FIG. 20
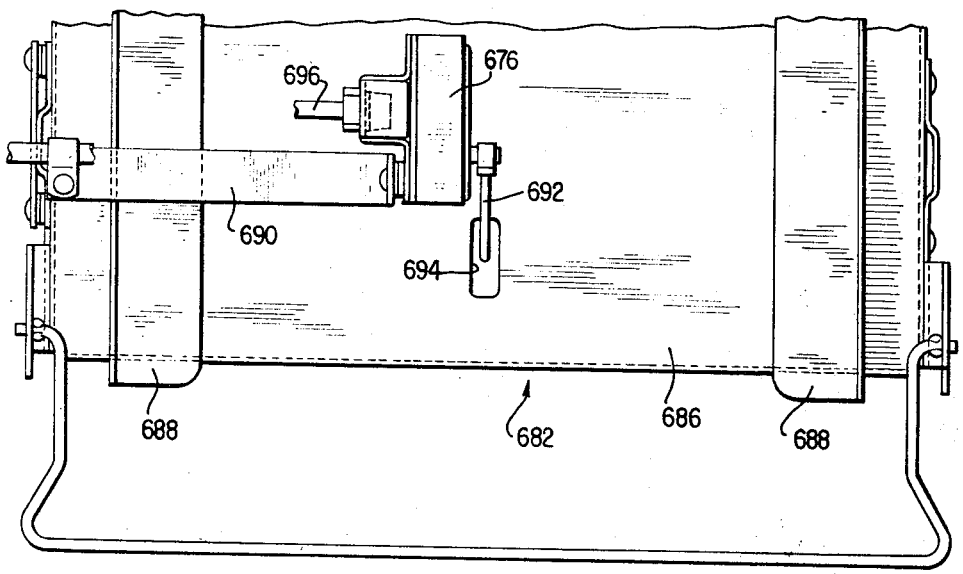
INVENTORS
KENNETH J. TONKIN
JOHN P. GALLAGHER
BY  *Diggins and O'Boyle*
ATTORNEYS.

A United States Patent Office 3,412,676
Patented Nov. 26, 1968

3,412,676
AUTOMATED CONTROL SYSTEM AND APPARATUS FOR OFFSET DUPLICATING MACHINE
Kenneth J. Tonkin, Glenview, and John P. Gallagher, Chicago, Ill., assignors to A. B. Dick Company, Chicago, Ill., a corporation of Illinois
Filed July 7, 1965, Ser. No. 470,078
42 Claims. (Cl. 101—144)

This invention relates to duplicating machines generally, and more particularly to automated duplicating machines of the offset lithographic type.

The ultimate goal in duplicating machine design is the achievement of a duplicating machine structure with the capability to provide a maximum number of clear copies during a minimum time span while requiring only a minimum of operator supervision. In the case of offset lithographic machines, the attainment of this goal has long been frustrated by the inherent nature and operation of such machines which, in the past, have required the supervision of a skilled operator to manually manipulate the machine during a plurality of individual processing steps.

The procedure for operating the conventional offset duplicating machine entails the manual performance of a large number of sequential steps which are quite exacting and complicated. However, this operating procedure may be readily adapted to automation by breaking it into three operational phases; namely, a preduplicating phase, a duplicating phase, and a postduplicating phase.

Previous attempts to provide effective automation for offset lithographic duplicators have resulted in programming systems of extreme complexity which are subject to numerous deficiencies. A number of the presently existing programming units for offset duplicators include complex and expensive switching systems which seldom provide automation for all three of the operative phases of the duplicating machine. In many instances, attempts to completely automate the preduplicating phase of an offset machine have proved deficient, for during this phase of operation variable conditions exist which often may be more effectively controlled by a manual operation. For example, during the preduplicating phase, a dampening or etching solution is applied to the lithographic plate to render portions of the plate ink repellent. The amount of etching solution applied to the plate to effectively render the nonprinting surfaces thereof ink repellent depends upon the type of plate employed and the ambient atmospheric conditions present in the locality of the plate. Thus it is difficult to effectively predetermine for a programming unit the volume of etching solution necessary to adequately prepare a lithographic plate for each duplicating operation.

The high malfunction ratio of present programming units for offset duplicators which is often caused by failure of complex electrical counters and switching systems in the program control units for such duplicators has given rise to a need for a new approach to offset automation. It is imperative that the automation of an offset duplicating machine be achieved through the use of a simply operated, highly reliable, but versatile programming unit effective to control the preduplicating, duplicating, and postduplicating functions of such machine.

The primary object of this invention is to provide a novel and improved automated offset lithographic duplicating machine adapted to operate rapidly and effectively with a minimum of operator supervision.

Another object of this invention is to provide a novel and improved automated offset lithographic duplicating machine which incorporates a novel programming unit.

A further object of this invention is to provide a novel and improved programming unit for an offset lithographic duplicating machine which includes electrical circuitry which is programmed by a mechanically actuated mechanical counter assembly.

Another object of this invention is to provide a novel and improved programming unit for an offset lithographic duplicating machine which includes a mechanically actuated mechanical counter assembly adapted to register the number of copy sheets fed through the machine during the duplicating phase of machine operation and the number of cycles of rotation of the impression cylinder of the duplicating machine during the post-duplicating phase of machine operation.

A further object of this invention is to provide a novel and improved programming unit for an offset lithographic duplicating machine which includes a single manually operable control unit for controlling the operation of the duplicating machine during the preduplicating phase of operation of the machine.

Another object of this invention is to provide a novel and improved programming unit for an offset lithographic duplicating machine which controls the preduplicating phase of machine operation in response to the positioning of a single manual control unit, the duplicating phase of machine operation in response to the number of copy sheets fed through the duplicating machine, and the post-duplicating phase of machine operation in response to the cycles of rotation completed by the impression cylinder of the duplicating machine.

A further object of this invention is to provide a novel and improved programming unit for an offset lithographic duplicating machine which is capable of electrically adapting itself to provide programming for a number of differing modes of machine operation.

Another object of this invention is to provide a novel and improved programming unit for an offset lithographic duplicating machine which operates universally for all modes of machine operation to sequentially energize selected machine components, thereby insuring against the occurrence of an overloaded power supply circuit condition.

A further object of this invention is to provide a novel and improved programming unit for an offset lithographic duplicating machine which is adapted to permit the temporary termination of machine operation at any point during the duplicating or postduplicating phases of machine operation without resulting in the resetting of the counter assembly or an interruption of the nomal programmed sequence of machine operation.

Another object of this invention is to provide a novel and improved programming unit for an offset lithographic duplicating machine which operates automatically if the duplicating machine operation is temporarily terminated at a point in the programmed cycle after the ejection of an offset master from the master cylinder of the machine to prevent contact between the bare master cylinder and the form rollers of the machine when the machine is restarted.

A further object of this invention is to provide a novel and improved programming unit for an offset lithographic duplicating machine which is adapted to operate normally to control the duplicating machine for a programmed preduplicating and postduplicating phase of machine operation while permitting a nonprogrammed random sheet feed to occur during the duplicating phase of machine operation.

Another object of this invention is to provide a novel and improved programming unit for an offset lithographic duplicating machine which is adapted to automatically render the counter assembly of the programming unit inoperative during the feeding of copy sheets from an overchute feed tray attached to the duplicating machine and which operates to resume control of the duplicating machine and initiate a programmed duplicating and postduplicating phase of operation when the sheet supply from the overchute feed tray is depleted.

A further object of this invention is to provide a novel and improved programming unit for an offset lithographic duplicating machine which is adapted to permit manual operation of machine components during a manual duplicating run and which includes a single manually operable preduplicating control unit adapted to mechanically prepare the duplicating machine for a manual duplicating operation or to mechanically and electrically prepare the duplicating machine for an automated duplicating operation.

Another object of this invention is to provide a novel and improved master cylinder brake and program control unit therefor which is operable to brake the master cylinder of an offset lithographic duplicating machine at the same point in the cycle of rotation of the master cylinder at the end of a duplicating run.

A further object of this invention is to provide a novel and improved sheet receiving tray and program control unit therefor which is adapted to shift position at the end of each duplicating run of an offset lithographic duplicating machine to alternately position groups of copy sheets received from succeeding duplicating runs.

Another object of this invention is to provide a novel and improved night latch and automated form roller assembly for an automated offset lithographic duplicating machine which is adapted to be either manually or automatically actuated to control the operation of the duplicating machine form rollers and which operates in the night latch position to interrupt power to the programming unit of the duplicating machine.

A still further object of this invention is to provide a novel and improved programming unit for an offset lithographic duplicating machine which includes a single mechanically actuated mechanical counter assembly for controlling the operation of the programming unit during both the duplicating and postduplicating phases of operation of the duplicating machine.

The foregoing and other objects of the invention will become apparent upon a consideration of the following specification and appended claims taken in conjunction with the accompaying drawings in which:

FIGURE 5 is a perspective view of a portion of the preduplicating control unit of the present invention;

FIGURE 6 is a perspective view of a portion of the preduplicating control unit of the present invention;

FIGURE 8 is a circuit diagram illustrative of a portion of the circuit of FIGURE 7;

FIGURE 9 is a circuit diagram illustrative of a portion of the circuit of FIGURE 7;

FIGURE 10 is a circuit diagram illustrative of a portion of the circuit of FIGURE 7;

FIGURE 18 is a view in side elevation of the sheet receiving tray of the present invention;

FIGURE 19 is a diagrammatic representation of the operating mechanism for the sheet receiving tray of the present invention; and FIGURE 20 is a plan view of the overchute feed table employed with the present invention.

General duplicator structure

Figure 1:
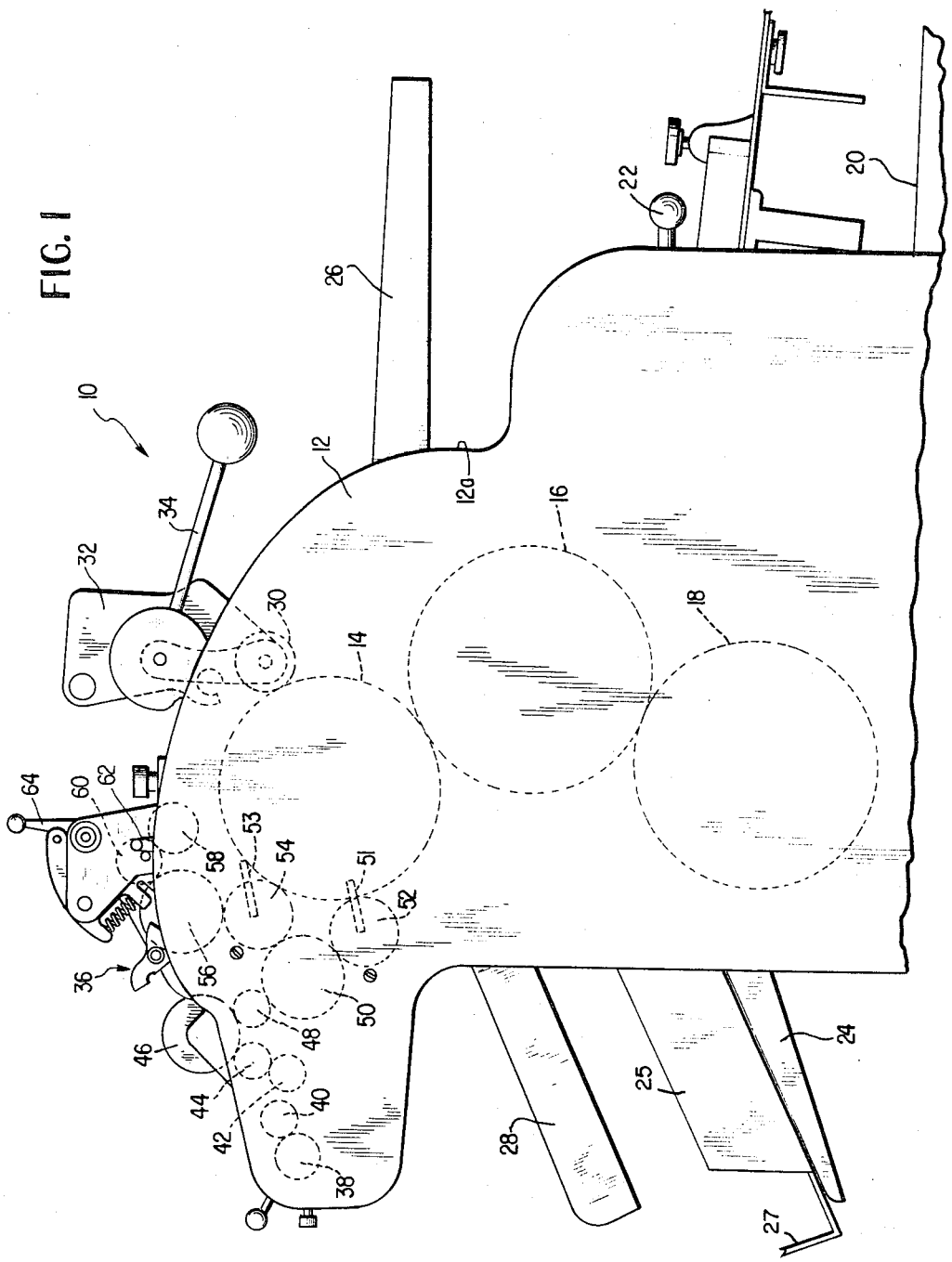
FIGURE 1 is a view in side elevation of a duplicating machine incorporating the programming unit and programmed duplicator components of the present invention.

Referring now to FIGURE 1, the automated offset lithographic duplicating machine incorporating the novel programming unit and mechanical programmed components of the present invention is indicated generally at 10 and embodies a basic construction which is conventional to well known duplicating machines of this type. The framework of the offset duplicating machine 10 is formed primarily by a side plate assembly 12 which is maintained in spaced relationship with a similar side plate assembly 12a (not shown). The side plate assemblies 12 and 12a support the various instrumentalities of the duplicating machine 10.

For ease of description, side plate assemblies 12 and 12a will hereafter be generally referred to as "side plates." Normally, however, each side plate assembly includes an upper plate supporting the duplicator ink system, master cylinder, and preduplicating control unit and a lower plate supporting the remaining major machine components. The upper plate moves relative to the lower plate to permit raising and lowering of the master cylinder without dislocating the spaced relationship between the ink system and the master cylinder.

As illustrated by FIGURE 1, a master cylinder 14, an offset or blanket cylinder 16, and an impression cylinder 18 are mounted for rotation between the side plates 12 and 12a. The master cylinder 14 is adapted to hold a lithographic master or sheet having an ink receptive image thereon, while the blanket cylinder 16 is mounted for rotational and reciprocatory movement between the plates 12 and 12a and is adapted to be selectively engaged by the master cylinder 14. When the master cylinder 14 is moved into engagement with the blanket cylinder 16, the blanket cylinder receives a reversed inked image from the lithographic sheet or plate mounted upon the master cylinder.

Copy sheets are adapted to be fed into the duplicating machine 10 from a sheet holding tray 20 by means of a suitable sheet feeding device (not shown). For example, the combination sheet feeding device and paper feed table illustrated by United States Letters Patent No. 2,942,877 to W. R. Fowlie et al., issued June 28, 1960, may be effectively employed with the duplicator 10.

The sheet feeding device is actuated by means of a control handle 22 and operates to remove single copy sheets from the sheet feeding table 20 and subsequently feed such sheets between the blanket cylinder 16 and the impression cylinder 18 so that the inked image from the blanket cylinder is transferred to the copy sheets. The copy sheets, after receiving an imprinted inked image, are then discharged into a receiving tray 24. This receiving tray includes side walls 25 extending along either side thereof and a front stop 27 positioned forwardly of the sidewalls to check the forward movement of sheets discharged into the tray 24.

The lithographic master sheet or plate is initially positioned upon a support tray 26 from whence it is subsequently removed and secured to the master cylinder 14 by clamping means on the master cylinder. Upon the completion of a predetermined duplicating cycle, the lithographic master is automatically removed from the master cylinder 14 and ejected into a receiving tray 28.

Before the duplicating machine 10 begins a duplicating phase of operation, the machine must be subjected to a preparatory preduplicating phase during which the nonprinting surfaces of the lithographic master on the master cylinder 14 are coated with an ink repellant solution by means of an etch roller 30. Roller 30 is movably mounted upon a preduplicating control unit 32 which, in turn, is secured between the side plates 12 and 12a. The preduplicating control unit 32 includes a control handle 34 which may be manually operated to move the roller 30 into contact with the master cylinder 14.

Both ink and ink repellant etching solution are supplied to the master cylinder 14 by means of an inking and etching system indicated generally at 36. Although any suitable inking and etching system 36 may be employed, it is preferable to employ an automated system which is similar in general construction and operation to the nonautomated repellant system for lithographic duplicators illustrated by United States Letters Patent No. 2,929,316 to W. R. Fowlie, issued Mar. 22, 1960.

The inking system includes an ink fountain roller 38 which transfers ink from an ink fountain (not shown) to the surface of an ink ducter roller 40. Ink ductor roller 40 is an oscillating roller which transfers ink intermittently to a distributor roller 42 which, in turn, transfers ink to a second distributor roller 44. Ink from the second distributor roller is then transferred to the surface of an oscillating ink roller 46, and roller 46 operates to evenly spread ink onto a distributor roller 48 which contacts an oscillating roller 50. The oscillating roller 50 contacts a lower ink from roller 52 and an upper ink form roller 54, both of which operate to spread ink onto the lithographic master carried by the master cylinder 14. The form rollers 52 and 54 are automated form rollers, and the novel operating mechanism for mounting and controlling these form rollers will be subsequently described.

It should be noted that the upper ink from roller 54 also contacts an oscillating distributor roller 56 which oscillates to aid in the even distribution of ink upon the master. Additionally, the upper ink form roller 54 and the oscillating distributor roller 56 form part of the system which supplies etching solution to the master cylinder 14. This etching solution is provided to the oscillating distributor roller 56 from a fountain (not shown) by means of a fountain roller 58 and a ductor roller 60. Ductor roller 60 may be moved into or out of variable timed contact with the oscillating distributor roller 56 by means of an operating handle 62, to achieve effective metering of ink repellant etching solution provided to the system, and may be completely disengaged from contact with both the fountain roller 58 and the oscillating distributor roller by movement of an operating handle 64. The ductor roller is mounted between the sidewalls 12 and 12a on a pivoted mount which is positioned by a lockout assembly. The ductor lockout assembly may be operated manually by the handle 64 which is secured thereto or automatically by a solenoid actuator connected to move the lockout assembly and cause the ductor roller to pivot into contact with the oscillator roller.

*Mechanical counter assembly*

Figure 2:
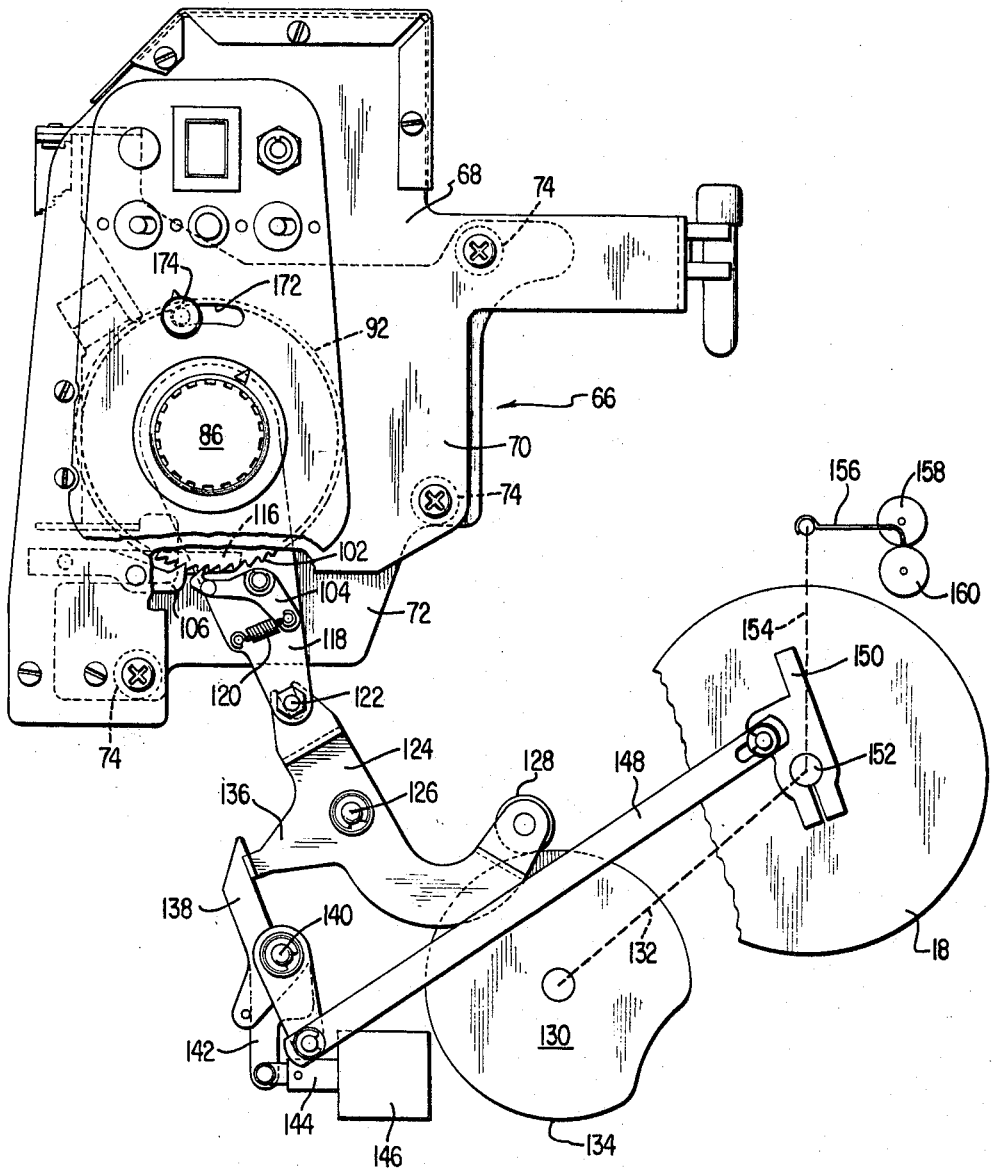
FIGURE 2 is a view in side elevation illustrating the counter assembly of the present invention and the operating mechanism for such assembly.
Figure 3:
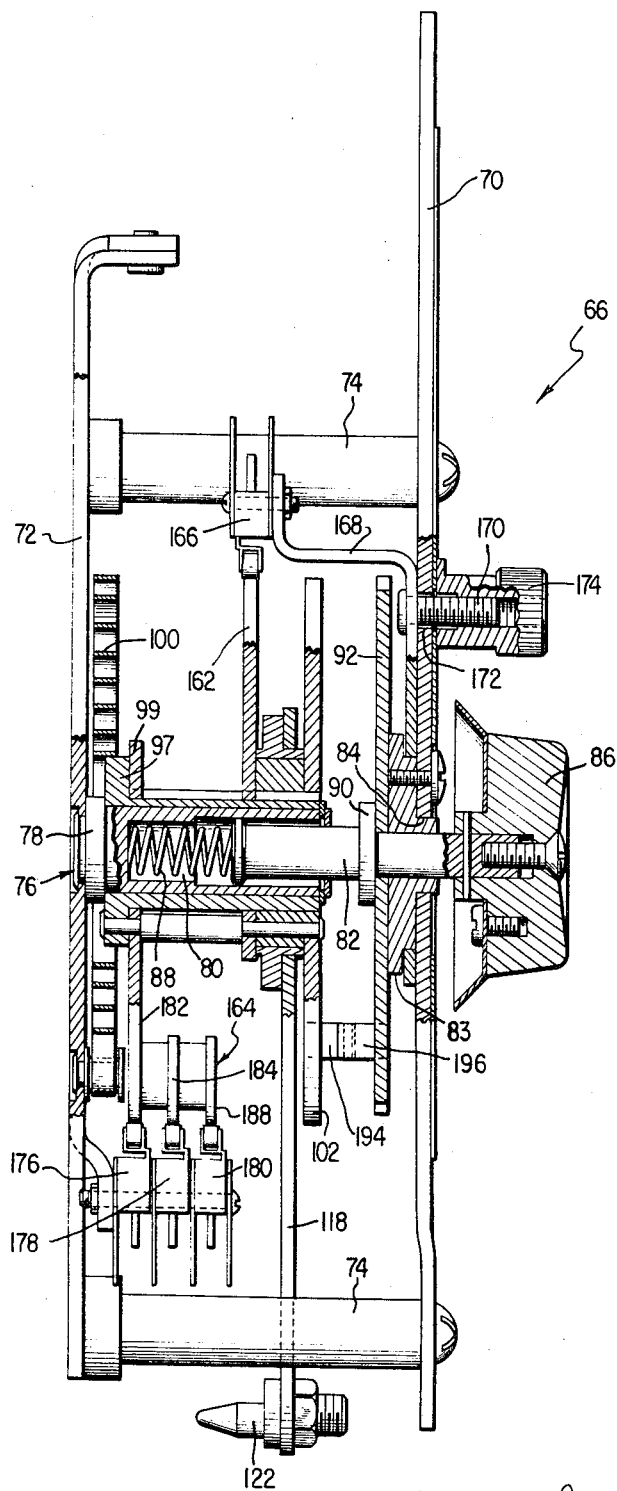
FIGURE 3 is a partially sectioned view in side elevation of the counter assembly of the present invention.
Figure 4:
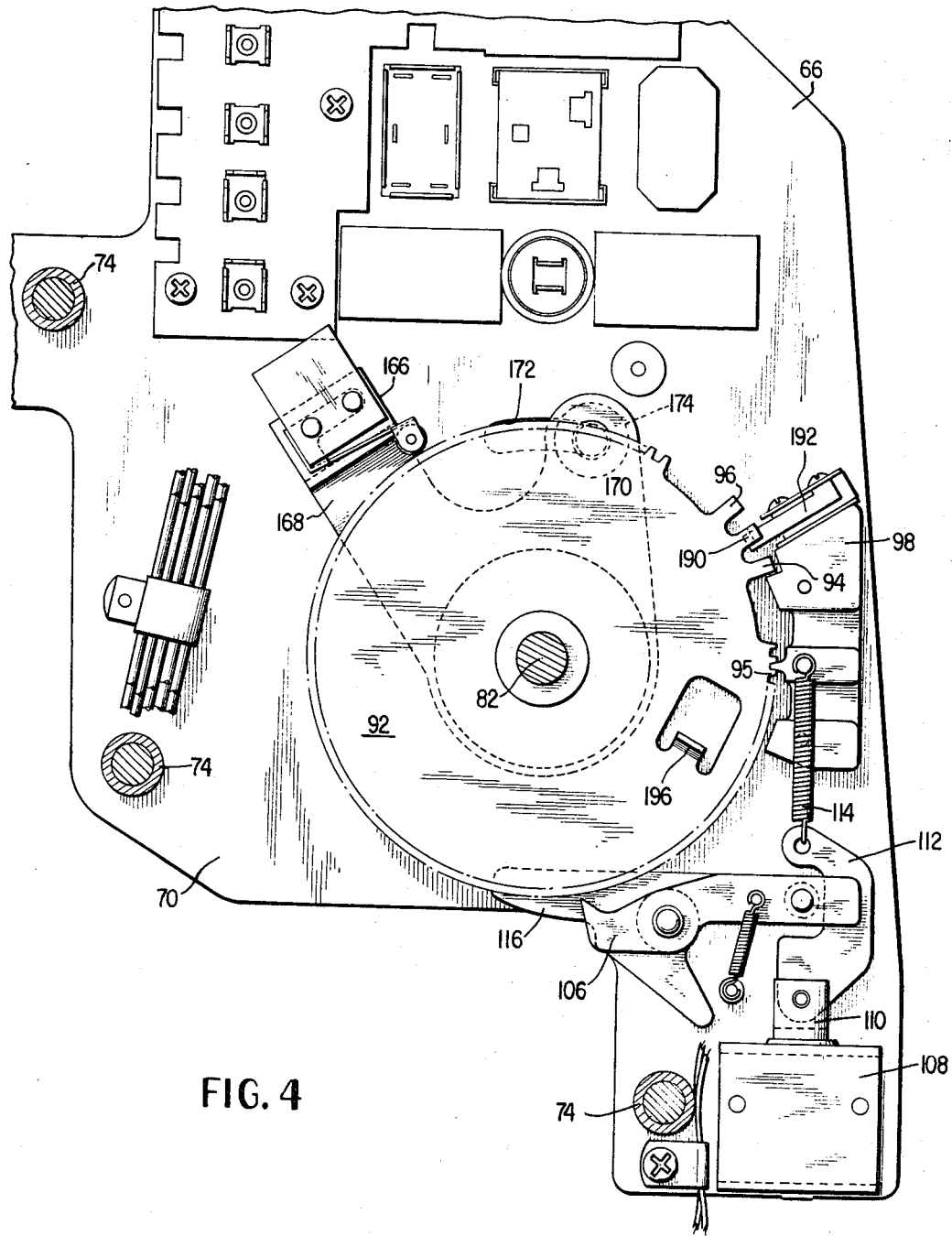
FIGURE 4 is a view in front elevation of the components mounted upon the rear of the housing for the counter assembly of the present invention.

The novel programming unit employed to automate the duplicating machine 10 is basically controlled by a mechanical counter assembly indicated generally at 66 in FIGURES 2–4 which constitutes the heart of the programming system. During the duplicating operational phase of the duplicating machine, the mechanical counter assembly 66 operates as a sheet counter and is mechanically actuated to provide a count with relation to the leading edge of each copy sheet which is fed into the duplicating machine from the sheet holding tray 20. During the postduplicating phase of operation, the same counter assembly operates as a cycle counter to count the cycles of rotation of the impression cylinder 18. Thus the control which the counter assembly 66 exercises over the programming system of the duplicating machine 10 relates to the leading edge of the copy sheets from the sheet table 20 during the duplicating phase of operation of the machine and, upon completion of the duplicating phase, such control is subsequently related to the cyclic rotation of the impression cylinder 18. The counter assembly must therefore be capable of functioning in a dual capacity as both a sheet count and a cycle count register.

It is important to note that at no time does the mechanical counter assembly 66 operate to provide a program control which functions in timed relationship to the master cylinder 14 as has been often prevalent in existing programming units for offset duplicators. Programming control, when made dependent upon the rotation of the master cylinder, often proves inaccurate, for the control times achieved through master cylinder rotation are variable. For example, variation in such control times results when print adjustment at the master cylinder is accomplished in the manner often employed with conventional duplicating machines, for such print adjustment varies the rotational cycle of the master cylinder.

The mechanical counter assembly 66 constitutes an important feature in the novel programming unit of this invention, for the complete control of the duplicating and postduplicating phases of the duplicator 10 in accordance with a single mechanically actuated mechanical counter eliminates the need for expensive, complex, electrical counting systems and also furnishes a programming unit of great reliability. The use of a mechanical counter eliminates the malfunctions prevalent with previously employed electrical counting systems.

The mechanical counter assembly 66 and its use with the duplicating machine 10 may best be understood with reference to FIGURES 2–4 wherein the counter assembly is illustrated enclosed within a casing 68 which is in turn secured to the sidewall 12 of the duplicating machine 10. The housing 68 of the counter assembly includes a face plate 70 which is maintained in spaced relationship with a backing plate 72 by means of suitable spacers 74. Extending centrally between the face plate 70 and the backing plate 72 is a shaft unit 76 which mounts the major operating components of the counter assembly.

Shaft unit 76 includes a hollow cylindrical cam support stud 78 which is secured by riveting or other suitable means to the backing plate 72. The stud 78 includes a central chamber 80 which extends partially through the center of the stud and is adapted to support a gear segment shaft 82. Shaft 82 projects from within the central chamber 80 outwardly through a gear segment shaft support bearing 83 mounted in an aperture 84 in the face plate 70 and supports a sheet count control knob 86 outwardly of the face plate. The face plate 70 may be provided with suitable indicia adjacent the sheet count control knob 86 to indicate the position settings of the sheet count control knob necessary to accomplish desired predetermined sheet counts.

The gear segment shaft 82 may be moved longitudinally relative to the stud 78 by depressing the control knob 86 toward the face plate 70. This longitudinal movement is accomplished against the bias of a spring 88 which extends between the end wall of the chamber 80 and the terminal end of the gear segment shaft 82. The gear segment shaft is free for both rotational and longitudinal movement relative to the stud 78, but the longitudinal movement of the actuator shaft against the bias of the spring 88 is limited by a shoulder 90 formed on the gear segment shaft 82.

Integrally mounted on the gear segment shaft 82 for movement therewith is a gear segment 92 having lugs 94 and 96 which normally contact a gear stop 98 mounted upon the rear surface of the face plate 70 adjacent the gear segment 92. These lugs operate to define the maximum and minimum rotational limits of the gear segment. To set the counter assembly 66 to count a predetermined number of copy sheets, the knob 86 is pushed inwardly toward the face plate 70 against the bias of the spring 88. This causes the gear segment 92 to be moved inwardly away from the face plate 70 so that the teeth 95 provided thereon disengage from the gear stop 98 and permit subsequent rotation of the gear segment shaft 82. The gear segment shaft and a cam cluster support bearing 97 and cam cluster shaft 99 mounted upon the cam support stud 78 may then be rotated clockwise to any desired position, thereby setting a predetermined sheet count into the counter assembly 66. The cam cluster shaft is caused to follow the clockwise rotation of the gear segment shaft 82 due to contact between a projecting lug 196 on the gear segment 92 and a projecting lug 194 on a ratchet gear 102 secured to the cam cluster shaft and is tensionally loaded by a return spring 100 which maintains the contact between the lugs during the clockwise rotation of the shaft.

As the cam cluster shaft rotates clockwise from a zero setting to program into the counter assembly 66 a desired sheet count, tension is reduced on the return spring 100 which is connected between the backing plate 72 and the cam cluster shaft 99. Tension is increased on the return spring 100 as the cam cluster shaft moves in a counterclockwise direction during a sheet counting operation back toward the initial starting position indicated by the zero position of the control knob 86.

When the control knob 86 has been rotated clockwise to a position corresponding with a desired sheet count, the control knob is released so that the spring 88 moves the gear segment shaft 82 and gear segment 92 toward the face plate 70. The gear segment is re-engaged and locked by the gear stop 98 in the desired sheet count position so that further movement of the gear segment and actuator shaft is prevented.

The counter assembly 66 is driven by means of a pawl and ratchet arrangement which includes the ratchet gear 102. Step by step rotation of the ratchet gear in accordance with either the leading edges of the copy sheets being fed through the offset duplicator 10 or the rotation of the impression cylinder 18 is accomplished by means of a drive pawl 104 in combination with a locking pawl 106.

The complete mechanical drive system for the counter assembly 66 may best be understood with reference to FIGURES 2 and 4, which illustrate in detail the mechanical components for driving the ratchet gear 102. To initiate sheet counting by the counter assembly 66, a counter clutch solenoid 108 mounted upon the rear side of the face plate 70 is activated in a manner to be subsequently described. Counter clutch solenoid 108 includes a plunger 110 which is connected to a U-shaped link 112. Upon the energization of the clutch solenoid 108, the plunger 110 is retracted, moving the link 112 downwardly against the bias of a spring 114 which extends between the upper end of the link 112 and the gear stop 98. As the link 112 moves downwardly it releases the locking pawl 106 and a locking pawl cam 116 which are pivotally mounted upon the rear side of the face plate 70 and permits the locking pawl and locking pawl cam to move clockwise in FIGURE 4 so that the locking pawl contacts the ratchet gear 102. Conversely, upon deactivation of the counter clutch solenoid 108, the spring 114 moves the link 112 upwardly in FIGURE 4 to cause counterclockwise rotation of the locking pawl 106 and locking pawl cam 116 so that the locking pawl becomes disengaged from the ratchet gear 102.

Referring specifically to FIGURE 2, it will be noted that the drive pawl 104 is pivotally mounted upon a drive link 118, the upper end of which is rotatably supported about the stud 78. A biasing spring 120 extending between the lower end of the drive pawl 104 and the drive link 118 biases the drive pawl into contact with the teeth of the ratchet gear 102. This contact between the ratchet gear and the drive pawl is selectively controlled by the counter clutch solenoid 108 through the locking pawl cam 116. When the counter clutch solenoid is deactivated, the locking pawl cam contacts the drive pawl and moves the drive pawl against the bias of the spring 120 away from contact with the ratchet gear. Conversely, upon becoming energized, the counter clutch solenoid 108 causes the locking pawl cam 116 to move away from the drive pawl 104 and permit the drive pawl to come into contact with the teeth of the ratchet gear 102.

The drive link 118 is pivotally connected at 122 to a counter operating link 124 which is in turn pivoted about a shaft 126 secured to the side plate 12. The lower end of the counter operating link is provided with a roller 128 maintained in contact with the cam surface of a rotating cam 130 which rotates in timed relationship with the rotation of the impression cylinder 18. Rotating cam 130 is caused to complete one cycle of rotation for every cycle of rotation of the impression cylinder 18 by any suitable mechanical linkage means, indicated in dotted lines at 132. It is apparent that for each cycle of rotation of the cam 130, the roller 128 will ride over the high contour 134 of the cam, thereby causing the counter operating link 124 to pivot counterclockwise to initiate a corresponding counterclockwise movement of the counter drive link 118. This action of the counter operating link and the counter drive link causes the drive pawl 104 to rotate the ratchet gear 102 one step when counter clutch solenoid 108 is energized.

To prevent the counter assembly 66 from registering a sheet count when no copy sheet is fed into the duplicating machine 10, the counter operating link 124 is provided with a forwardly extending locking lug 136. Locking lug 136 cooperates with a locking lever 138 which is pivoted about a pivot rod 140 attached to the side plate 12 of the duplicator. The lower portion of the locking lever 138 below the pivot 140 is connected by means of a linkage 142 to the plunger 144 of a cycle count solenoid 146. The lower end of the locking lever 138 is also pivotally connected to one end of an elongated drive rod 148, the other end of which is connected to a counter operating lever 150. Counter operating lever 150 is mounted upon the shaft 152 of the impression cylinder 18 and is adapted to move with the shaft 152.

To illustrate the operation of the locking lever 138, it must first be noted that the impression cylinder shaft 152 is mounted upon pivotal mounts between the side plates 12 and 12a so that the impression cylinder 18 may be pivoted into and away from contact with the blanket cylinder 16. This movement of the impression cylinder 18 relative to the blanket cylinder 16 is accomplished by means of a mechanical linkage 154, indicated in dotted lines in FIGURE 2, which is controlled in accordance with the action of sheet sensing fingers 156 positioned to sense the presence of the leading edge of a copy sheet between feed rollers 158 and 160. The detailed mechanical structure of the mount for the impression cylinder shaft 152, the mechanical linkage 154, and the sheet sensing fingers 156 is illustrated by United States Letters Patent 2,860,577 to Wallace R. Fowlie, issued Nov. 18, 1958, which is incorporated herein by reference.

When the sheet sensing fingers 156 detect the presence of the leading edge of a copy sheet between the feed rollers 158 and 160, the mechanical linkage 154 causes the impression cylinder 18 to swing upwardly into contact with the blanket cylinder 16. The upward swing of the impression cylinder results in a clockwise rotation of the shaft 152, thereby causing a clockwise movement of the counter operating lever 150. As the counter operating lever moves in a clockwise direction, it exerts force upon the drive rod 148 to cause the latching lever 138 to move in a counterclockwise direction about the pivot 140 and disengage from the latching lug 136. The roller 128 is then permitted to follow the contour of the cam 130.

If no copy sheet is present between the feed rollers 158 and 160, the sensing fingers 156 cause the mechanical linkage 154 to move the impression cylinder 18 downwardly away from contact with the blanket cylinder 16, thereby causing a counterclockwise rotation of the cylinder shaft 152 and the counter operating lever 150. Correspondingly, the drive rod 148 causes the locking lever 138 to move in a clockwise direction about the pivot 140 to re-engage the locking lug 136, thereby preventing the counter assembly 66 from registering a further count with relation to the rotation of the cam 130.

When the predetermined number of copy sheets have been fed through the duplicating machine 10, the paper feed mechanism will be deactivated by the programming unit for the duplicating machine in a manner which will subsequently become apparent.

Upon deactivation of the feed mechanism, the absence of a copy sheet between the rollers 158 and 160 causes the sheet sensing elements 156 to activate the linkage 154, and the impression cylinder 18 is moved downwardly away from contact with the blanket cylinder 16. This disengagement of the impression cylinder from the blanket cylinder causes counterclockwise rotation of the impression cylinder shaft 152 and the counter operating lever 150, thereby resulting in the relatching of the counter operating link 124 by the locking lever 138. However, after the locking lever 138 has moved into position to re-engage the locking lug 136, the cycle count solenoid 146 may be energized to cause the plunger 144 to retract and pull the latching lever 138 in a counterclockwise direction. Thus, the latching lever 138 again becomes disengaged from the locking lug 136 on the counter operating link 124, and the roller 128 on the counter operating link will continue to follow the contour of the cam 130. With the cycle count solenoid 146 energized, the counter assembly 66 will register a count indicative solely of the cycles of rotation accomplished by the impression cylinder 18, and the counter assembly will be rendered completely non-responsive to either the presence or absence of a copy sheet between the feed rollers 158 and 160.

The step by step rotation of the ratchet gear 102 caused by the pawl 104 is transmitted by the ratchet gear to the cam cluster shaft 99 and also to a stop cam 162 and a cam bank assembly 164 secured to the cam cluster shaft. Stop cam 162 is adapted to reach a position at the end of the counting cycle of the counter assembly 66 where the stop cam will close a stop switch 166. The stop switch 166 may be selectively positioned with respect to the stop cam 162 by means of a mounting bracket 168 which movably suports the switch with relation to the counter housing 68. One end of the mounting bracket 168 is pivotally mounted on the gear segment shaft bearing 83, and extending from the mounting bracket is a pin 170 which projects through an arcuate slot 172 in the face plate 70. An indicator control knob 174 is secured to the pin 170 on the outer side of the face plate 70 and may be employed to move the pin 170 in the slot 172. Suitable indicia may be provided upon the face plate 70 adjacent the control knob 174 to indicate blanket wash cycles. As the pin 170 is repositioned in the slot 172, the mounting bracket 168 pivots about the gear segment shaft 82 and repositions the stop switch 166 relative to the stop cam 162.

The cam bank assembly 164 includes a plurality of individual cams which operate to contact and actuate a plurality of microswitches mounted upon the back wall 72 of the face plate 70 as the cam bank rotates about the support stud 78. These microswitches include a feed off switch 176, an eject switch 178, and a blanket wash switch 180 which cooperate respectively with a feed stop cam 182, an eject cam 184, and a blanket wash cam 188.

The operation of the counter assembly 66 becomes quite apparent upon consideration of the foregoing description. To set the counter assembly for a desired predetermined sheet count, the sheet count knob 86 is pushed inwardly against the bias of the spring 88 to disengage the gear segment 92 from the gear stop 98. The sheet count control knob 86 is then rotated clockwise relative to the indicia on the face plate 70 to a point where a desired sheet count is indicated. As the sheet count control knob 86 is moved in a clockwise direction, the gear segment 92, the ratchet gear 102, and the cam bank 164 are moved to the desired setting and tension is reduced from the return spring 100.

With the desired sheet count set into the counter assembly 66 and the gear segment 92 locked against further movement by the gear stop 98, a predetermined blanket wash cycle is then set into the counter assembly by manipulating the control knob 174 to correspond with a desired blanket wash cycle indicated by the blanket wash indicia on the face plate 70.

When the counter clutch solenoid 108 is energized and the counter assembly 66 is properly programmed for a predetermined sheet count and blanket wash cycle, the ratchet gear 102 will be driven counterclockwise in a step by step manner by the pawl 104 as copy sheets pass between the sheet fed rollers 158 and 160. The ratchet gear 102 moves the cam cluster shaft 99 toward the zero sheet position, and the cam bank 164 moves step by step toward the microswitches 176, 178 and 180 while the tension on the return spring 100 increases.

At this point it should be noted that the gear segment 92 is provided with a tooth 190 which contacts and closes an end cycle safety switch 192 for a manual end cycle switch (to be subsequently described). The end cycle safety switch 192 is mounted upon the rear surface of the face plate 70 so as to contact the tooth 190 only when the sheet count control knob 86 is positioned in the one sheet count position, and the manual end cycle switch is effective only when the end cycle safety switch is closed. During normal sheet counting operation, the control knob 86 is preset for a sheet count higher than one, and the end cycle safety switch 192 remains open.

When the preset number of copy sheets have been counted, the cam cluster shaft 99 will be in its initial zero position and the feed stop cam 182 in cam bank 164 contacts the microswitch 176, while eject cam 184 closes microswitch 178 when the last sheet is printed. On the following count of the counter assembly 66, which is the first count of a cycle of rotation of the impression cylinder 18, the eject cam 184 releases the microswitch 170 and the blanket wash cam 188 closes the microswitch 180. Before the completion of this cycle count, the feed stop cam 182 releases the microswitch 176.

The complete circuitry controlled by the microswitches 176, 178 and 180 will be subsequently described, but it is noteworthy at this point that the depression of the feed off switch 176 by the feed stop cam 182 causes the de-energization of the sheet feed mechanism for the duplicator 10 so that the flow of copy sheets between the feed rollers 158 and 160 ceases. Simultaneously, the microswitch 176 causes the energization of the cycle count solenoid 146 so that the counter assembly 66 will continue to count the cycles of rotation of the impression cylinder 18 as previously described. It is important to note that the counter assembly 66 is immediately switched to the cycle count mode upon the zeroing of the cam cluster shaft 99, and the de-energization of the sheet feed mechanism so that the counter assembly continues with a cycle count upon the next rotation of the cam 130 and no delay results between the sheet count and cycle count functions.

As the counter assembly 66 initiates the cycle count function, the ratchet gear 102 continues to move the cam cluster shaft 99 in a counterclockwise direction increasing the tension on the return spring 100, while the gear stop 98 continues to arrest movement of the gear segment 92 and the sheet count control knob 86. This movement of the cam cluster shaft carries the cam bank 164 past the microswitches 176, 178 and 180 and the stop cam 162 toward an ultimate contact with the stop switch 166.

The closing of the stop switch 166 by the stop cam 162 after the preset number of cycle counts have been recorded results in the energization of numerous electrical circuits to be hereinafter described, but at this point it should be understood that when the stop switch is closed, the counter clutch solenoid 108 and the cycle count solenoid 146 are de-energized. Upon the de-energization of the cycle count solenoid 146, the locking lever 138 is again caused to engage the locking lug 136 and prevent further operation of the drive pawl 104. Simultaneously, upon de-energization of the counter clutch solenoid 108, the locking pawl 106 is caused to move out of contact with the ratchet gear 102 while the locking pawl cam 116 also disengages the drive pawl 104 from the ratchet gear 102. With the release of the ratchet gear 102 by the drive pawl and the locking pawl, the return spring 100 is permitted to rotate the cam cluster shaft 99, the cam bank 164, the stop cam 162, and the ratchet gear 102 clockwise to the initial sheet count starting position. The return movement of the ratchet gear 102 is terminated at the initial, preset sheet count starting position by re-engagement between the projecting lugs 194 and 196.

*Preduplicating control unit*

The primary manual operation to be performed by an operator of the duplicating machine 10 when such machine is controlled by the programming unit of the present invention consists in manipulating the preduplicating manual control unit 32 during the preduplicating phase of operation. This preduplicating control unit prepares the duplicating machine 10 both mechanically and electrically for the subsequent program controlled duplicating and postduplicating phases of operation.

Referring to FIGURES 5 and 6, it will be noted that the preduplicating control unit 32 is manually controlled by means of a four position control handle 34 secured to the hub 198 of a master cam 200. Master cam 200 is mounted upon a central shaft 202 which extends between the side plates 12 and 12a of the duplicating machine. Rotation of the master cam by means of the handle 34 causes a corresponding rotation of the shaft 202.

A pair of mounting arms 204 and 206 are integrally mounted upon the shaft 202 and extend outwardly therefrom in substantially parallel relationship. The outer end of the mounting arm 206 is connected to the side plate 12a by means of an elongated link 208, one end of which is pivotally connected to the mounting arm 206 at 210. The end of the link 208 opposite the pivotal connection 210 is provided with a projecting lug (not shown) which rides in a slot 212 in the side plate 12a.

The etch roller 30 is mounted for rotation on the mounting arms 204 and 206 and extends transversely between said mounting arms in spaced relationship with the shaft 202. Upon rotation of the shaft 202, the etch roller is adapted to be moved by the mounting arms 204 and 206 into contact with either the master cylinder 14 or a sponge 214 secured above the shaft 202 and extending transversely between the side plates 12 and 12a. Sponge 214 acts as a reservoir for a suitable ink repellent solution to be applied by the etch roller 30 to a lithographic master mounted on the master cylinder.

The master cam 200 is connected to a double cam assembly including a cam 216 and a cam 218 by means of a pivoted link 220. Movement of the master cam 200 to the four separate positions indicated by the indicia 222 on the side of the master cam causes a corresponding movement of the cams 216 and 218. This four position movement of the master cam is controlled by means of a lever 224 pivoted to the side wall 12 at 226 which carries a roller 228 maintained in contact with the master cam 200 by means of a spring 230. The roller 228 cooperates with detents in the surface of the master cam to cause the master cam to stop at the four positions indicated by the indicia 222.

The cams 216 and 218 are rotatably mounted upon the side wall 12 by means of a shaft 232 which also carries a trip lever 234, the trip lever being connected for rotation with the cam 218. Trip lever 234 is adapted to contact and pivot an L-shaped link 236 about a pivot pin 238 against the bias of a spring 240 which extends between the shaft 232 and the upper arm of the link 236. Shaft 238 mounts the link 236 upon the side wall 12 of the duplicator 10.

The lower arm of the link 236 is connected to an extension link 242 which in turn is connected to the sheet feed control handle 22. The sheet feed control handle is pivoted about a pivot pin 244 by the extension link 242 to actuate the sheet feed control for the duplicator 10. The sheet feed control handle may be subsequently returned to an off position by means of a solenoid operated lever 246 which may be moved downwardly by a solenoid (not shown) to contact a pin 248 on the sheet feed control handle 22 and thereby return the control handle to the off position.

The pin 238 also supports a second pivoted L-shaped lever 250, the upper arm of which carries a roller 252 which is maintained in contact with the cam surface of the cam 218 by a spring 254 extending between the lever 250 and the side plate 12 of the duplicating machine. The lower arm of the lever 250 carries a roller 256 which contacts the surface of a pivoted locking arm 258. Locking arm 258 is pivoted upon the side plate 12 by a pin 260 and is biased against the roller 256 by means of a spring 262 extending between the locking arm 258 and a pin which is mounted on the side plate and projects outwardly therefrom to engage one end of the spring 262.

The upper edge of the locking lever 258 is provided with a stepped surface 264 which cooperates with a corresponding stepped surface 266 on a master cylinder lever 268. The master cylinder lever 268 is secured to a pivotal mount 270 for the shaft of the master cylinder 14 and is adapted to pivot the shaft mount for the master cylinder shaft in a counterclockwise direction in response to the bias of a spring 272 extending between the master cylinder lever and the side wall 12. This pivotal movement of the master cylinder lever 268 and the shaft mount 270 operates to move the master cylinder toward or away from contact with the blanket cylinder 16. When the locking lever 258 is released from contact with the master cylinder lever 268, the master cylinder lever is caused to rotate the master cylinder shaft mount 270 in a counterclockwise direction by the bias of a spring 274 extending between the master cylinder lever 268 and the side wall 12, thereby moving the master cylinder away from contact with the blanket cylinder. The unlatching of the master cylinder lever 268 by the latching lever 258 is accomplished by means of an actuating arm 278 extending between the latching lever and the impression cylinder operating mechanism. Thus, when the impression cylinder 18 is moved away from contact with the blanket cylinder 16, the link 278 causes the locking link 258 to unlatch the master cylinder lever 268 and permit the master cylinder to correspondingly move away from the blanket cylinder.

The lower portion of the master cylinder lever 268 carries a roller 280 which cooperates with a cam follower 282 to cause the master cylinder lever to rotate in a clockwise direction against the bias of the spring 272 to bring the master cylinder into contact with the blanket cylinder and permit engagement between the master cylinder lever and the locking lever 258. The complete mechanism for operating the master cylinder in this manner is well illustrated by the previously mentioned United States Letters Patent 2,860,577, to Wallace R. Fowlie.

It is apparent that rotation of the master cam 200 and the cams 216 and 218, will actuate a plurality of microswitches, some of which are illustrated at 284 and 286, which are mounted upon the sidewall 12 and spaced about the periphery of the cams. The electrical circuits controlled by these microswitches will be subsequently described, but at this point it is important to comprehend the mechanical functions performed by the preduplicating control unit 32.

At the beginning of the preduplicating phase of the duplicating machine 10, the lever 34 of the preduplicating control unit 32 is moved fully clockwise to correspondingly move the master cam 200 clockwise into the etch-start position. This clockwise movement of the master cam 200 causes clockwise rotation of the shaft 202, and the mounting arms 204 and 206 lower the etch roller 30 into contact with the master cylinder 14. As the roller 30 is moved downwardly, the link 208 pivots in the slot 212 to insure that the etch roller is positioned to properly contact the master cylinder.

The clockwise movement of the master cam 200 into the etch-start position causes the double cam assembly including the cams 216 and 218 to also move in a clockwise direction under the influence of the link 220 and the trip lever 234 passes over the L-shaped link 236.

In the etch-start position, the duplicating machine 10 is energized and the master cylinder 14 is caused to rotate so that ink repellent fluid may be applied by the etch roller 30 to a lithographic master supported on the surface of the master cylinder. This ink repellent fluid has been previously supplied to the etch roller by the sponge 214 before the manual actuation of the control handle 34 occurs.

When the lithographic master on the master cylinder 14 has been sufficiently coated with ink repellent solution, the master cam 200 is manually moved in a counterclockwise direction to the ink position. This movement of the master cam from the etch-start position to the ink position causes the etch roller 30 to move upwardly away from contact with the master cylinder. Also, the cams 216 and 218 are moved in a counterclockwise direction by the link 220 so that the microswitch controlling the ink system of the duplicator is cam actuated.

Subsequent to the inking operation, the handle 34 is again moved to rotate the master cam counterclockwise to the image position. The corresponding counterclockwise movement of the cam 218 to the image position causes the roller 252 to reach a low on the surface of the cam 218 and the spring 254 thereby pivots the L-shaped lever 250 in a clockwise direction about the pin 238. This clockwise movement of the lever 250 brings the roller on the lower arm of the lever into contact with the latching lever 258 and causes the stepped surface 264 of the latching lever to engage the surface 266 of the master cylinder lever 268, thereby locking the master cylinder lever so that the master cylinder 14 is locked in contact with the blanket cylinder 16.

The preduplicating phase of operation for the duplicator 10 is completed by moving the control handle 34 counterclockwise to bring the master cam 200 into the final feed position. This movement of the master cam from the image to the feed position results in a corresponding counterclockwise movement of the cams 216 and 218 as well as counterclockwise movement of the trip lever 234. During this counterclockwise movement, the trip lever 234 contacts the upper arm of the L-shaped link 236 and moves the link clockwise about the pivot 238, thus causing the lower arm of the link to pull on the feed extension lever 242. The feed extension lever 242 pivots the feed control knob 22 upwardly about the pivot point 244 to the feed on position. As the trip lever 234 continues past the link 236, the spring 240 causes the link to move to a neutral position with respect to the feed extension link 242. The preduplicating phase of the duplicator 10 is now complete, and the duplicator begins to produce copy.

*Electric programming unit-machine setup*

The novel mechanical counter assembly 66 and the mechanical components of the preduplicating control unit 32 previously described are designed to operate in conjunction with a novel electrical programming control system to effectively control the overall operation of the duplicating machine 10 during the preduplicating, duplicating, and postduplicating phases of operation. The electrical programming system for the duplicating machine includes electrical preduplicating, duplicating, and postduplicating control circuits which are selectively responsive to either the control unit 32 or the counter assembly 66, and when actuated effectively coordinate and control the diverse operations of the duplicating machine.

Figure 7B:
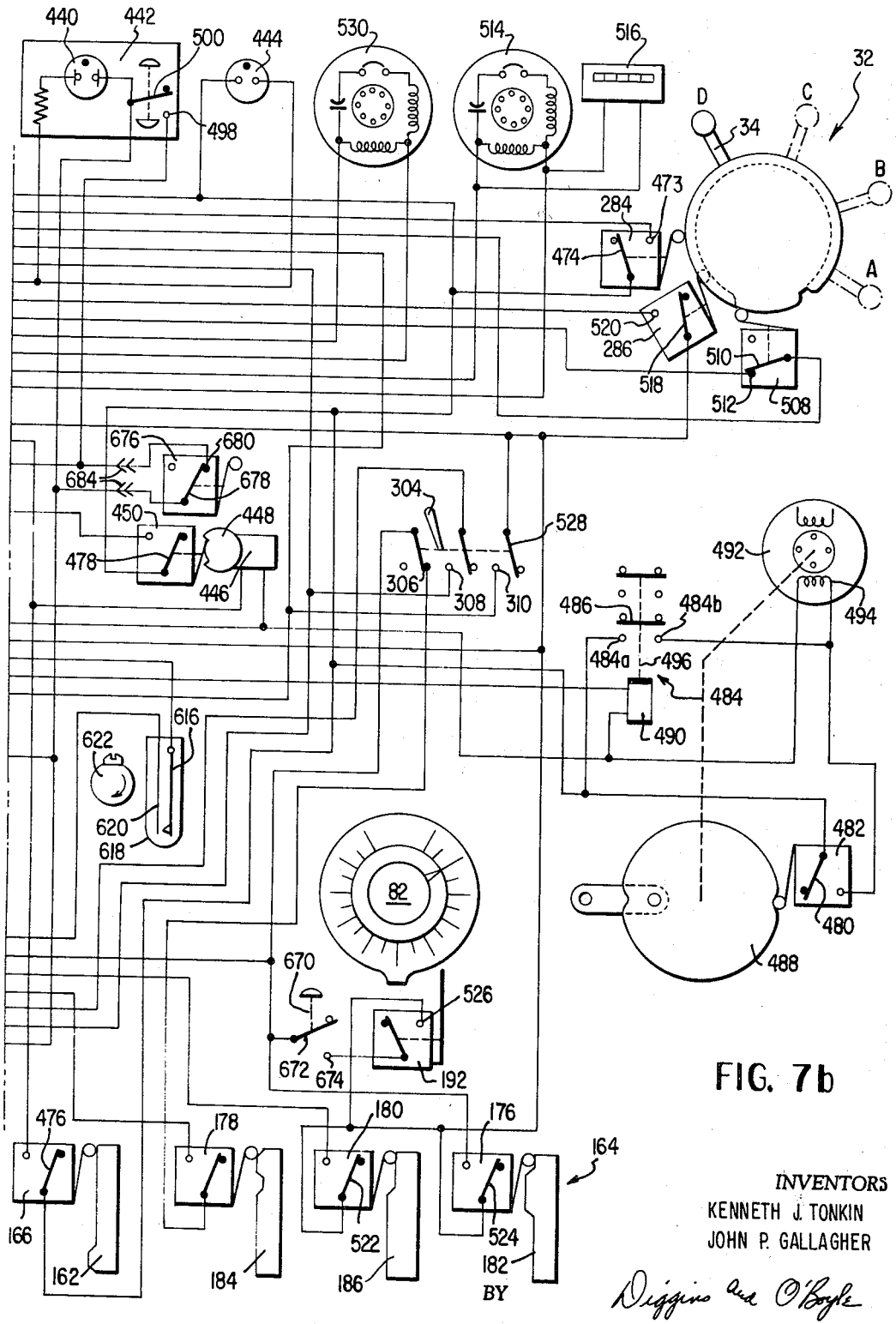
FIGURE 7 is a circuit diagram of the programming circuitry for the programming unit of the present invention.

The complete electrical programming circuitry for the duplicating machine 10 is illustrated at 300 in FIGURE 7, and this circuitry may best be understood by reviewing in a step by step manner the performance of the programming circuit during the operation of the duplicating machine.

The preliminary electrical and mechanical operations which must be accomplished to set up the programming circuitry 300 may best be understood by referring to FIGURE 7, wherein it will be noted that the power for the programming circuit is provided by a power input 302 having a positive side 302a, a negative side 302b, and a ground connection 302c. The power input may be connected to a suitable power supply.

To initially program the electrical programming circuitry 300, the control knob 82 of the mechanical counter assembly 66 is first preset to a desired sheet count and, as previously described, this operates to position the feed stop cam 182, the eject cam 184, and the blanket wash cam 188 of the cam bank assembly 164 relative to the feed stop switch 176, the eject switch 178, and the blanket wash switch 180.

Next the indicator control knob 174 on the face of the counter assembly 66 is adjusted to set the desired blanket wash cycle into the counter assembly and position the stop switch 166 relative to the stop cam 162.

After the mechanical counter assembly 66 has been preset, sections of the electrical programming circuitry 300 may be selectively energized to prepare for the preduplicating phase of operation. First, a ganged master eject switch 304 having switch contacts 306, 308 and 310 is moved to the on position in FIGURE 7 to complete a circuit across the switch contact 306 while breaking the circuit to switch contacts 308 and 310. Subsequently, a three position pump motor switch 312 including switch contacts 314, 316, 318, and 320 is switched to the automatic position of FIGURE 7. Switch 312 has three positions indicated as AUTO (automatic), OFF, and MAN (manual) and when the switch is in the off position, no circuits are completed through the switch. In the manual position of the pump motor switch, circuits are completed to contacts 314 and 318, while in the automatic position, circuits are completed to the terminals 316 and 320. Thus with the pump motor switch on automatic, a positive electrical circuit is completed from the power input terminal 302a through an electrical circuit breaker 322, and switch contact 320 to a solenoid switch contact 324a of a pump solenoid switch 324. The pump solenoid switch 324 includes switch contacts 324a and 324b which may be bridged by a switch arm 326 and solenoid contacts 324c and 324d which may be selectively closed by a switch arm 328. Switch arms 326 and 328 are gang mounted upon an actuator shaft 330 which moves the switch arms to make or break the electrical circuits across the solenoid switch contacts upon the energization or de-energization of a solenoid coil 332.

Also, as the pump motor switch 312 is moved to the automatic position, a negative circuit is completed from the power input terminal 302b through the pump motor switch contact 316 to the solenoid contact 324c of the pump solenoid switch 324.

After the pump motor switch 312 is placed in the automatic position, a three position drive motor switch 334 having a construction similar to that of the pump motor switch is similarly moved to the automatic position. The drive motor switch 334 includes switch contacts 336, 338, 340, and 342, and in the manual position of this switch, a circuit is completed across the terminals 336 and 340. In the automatic position of the drive motor switch, as shown by FIGURE 7, a positive circuit is completed from the terminal 302a of the power supply through a circuit breaker 344 and the switch contact 342 to a solenoid contact 346c of a drive solenoid switch 346. Simultaneously, a negative circuit is completed from the negative contact 302b of the power input through the drive motor switch contact 338 to a solenoid switch contact 346f of the drive solenoid switch 346.

The drive solenoid switch 346 includes switch contacts 346a–346f which may be selectively bridged by switch arms 348, 350, and 352, mounted upon an actuator shaft 354. As in the case of the pump solenoid switch 324, the actuator shaft 354 of the drive solenoid switch 346 is moved in response to the energization or de-energization of a solenoid coil 356.

In addition to the pump solenoid switch 324 and the drive solenoid switch 346, the closing of the drive motor switch contacts 338 and 342 also operates to electrically prepare several other circuit elements in the programming circuit 300 for future service during the preduplicating, duplicating and postduplicating phases of the duplicating machine 10. Considering briefly these additional circuit elements, it will be noted that the closing of drive motor switch contact 338 completes a negative circuit to a circuit point 438, from which a negative circuit is further completed to a form on solenoid 422, a water solenoid 424, a brake on solenoid 426, a wash solenoid 428, a form off solenoid 430, the counter clutch solenoid 108, a feed off solenoid 432, the cycle count solenoid 146, an eject solenoid 434, and an ink ductor solenoid 436. Additionally, a negative circuit is completed from the circuit point 438 to the solenoid coils 332, 356, 366, 376, 386, 398, 408, and 420 of a pump solenoid switch 324, a drive solenoid switch 346, a panel solenoid switch 358, a time delay solenoid switch 368, a form on solenoid switch 378, a brake solenoid switch 388, a form off solenoid switch 400, and an end cycle solenoid switch 410. These solenoid switches are generally similar in construction and operation to the solenoid switches 324 and 346, and include switch arm actuator shafts 364, 374, 384, 396, 406, and 418, which mount switch arms 360, 362, 370, 372, 380, 382, 390, 392, 394, 402, 404, 412, 414, and 416. The switch arms of the solenoid switches operate to contact selective switch contacts upon the energization or de-energization of the individual solenoid coil of each solenoid switch.

Additionally, a negative circuit is also completed from point 438 to a light 440 for a manually operated count switch 442, to a pilot light 444, and to the negative side of a timing motor 446. Timing motor 446 drives a cam 448 which operates to open and close a timing switch 450. The negative circuit is also completed to a solenoid coil 490 for a jogging motor solenoid switch 484 and to the field 494 of a jogging motor 492.

Considering now the remaining positive circuit completed by closing the circuit to the drive motor switch terminal 342, it will be noted that a positive circuit is made across a circuit breaker 452 to the switch contacts 358b of the panel solenoid switch 358, the switch contacts 368b, 368d, and 368f of the time delay solenoid switch 368, and the switch contact 400a of the form off solenoid switch 400. A positive circuit is also extended from the circuit breaker 452 to a number of cam operated and manually operated switch components. These include a positive circuit running to the switch arm 454 of a manually operated two position stop switch 456 which includes switch contacts 458 and 460, to the lower switch arm 462 of a manual ganged restart switch 464 having an upper switch arm 466 mechanically secured to the lower switch arm and three switch arm terminals 468, 470, and 472, to the pilot light 444, to a switch arm 474 of the start microswitch 284, to a switch arm 476 of the cam operated stop switch 166, to a switch arm 478 of the cam operated timing switch 450, and to the control circuitry for the jogging motor 492. The positive potential for the jogging motor control circuitry is provided to the switch arm 480 of a cam operated jogging motor switch 482 which is operated by a cam operator 488, and to the contact 484a of the jogging motor solenoid switch 484. The jogging motor solenoid switch 484 includes a switch arm 486 mounted on an actuator shaft 496 which is operated by the solenoid coil 490.

By tracing the circuit through the drive motor switch 334, it will be apparent that when the drive motor switch is switched to the automatic position, the pilot light 444 is immediately illuminated and a start holding circuit is completed across the switch arm 454 of the stop switch 456 to the stop switch contact 458, and then across the normally closed switch arm 394, the brake solenoid switch contacts 388h and 388g to the terminal 346a of the drive solenoid switch 346. Simultaneously, an end cycle holding circuit will be completed between the contacts 368d and 368c of the time delay solenoid switch 368 across the normally closed switch arm 370 to the contacts 410a and 410f of the end cycle solenoid switch 410 and also to a contact 498 for the normally open switch arm 500 of the count switch 442.

After switching the drive motor switch 334 to the automatic position, the count switch 442 is closed to complete the circuit between the terminal 498 and the switch arm 500 so potential can flow through the count switch light 440 and also across the switch arm 500 to the contact terminal 410e of the end cycle solenoid switch 410 and also across the counter clutch solenoid 108 to actuate the counter clutch. The counter assembly 66 is now enabled, in the manner previously described, by the energization of the counter clutch solenoid to count copy sheets as they pass through the duplicating machine 10.

The final step in preparing the duplicating machine 10 for the subsequent preduplicating phase of operation is accomplished by turning a night latch control shaft, to be subsequently described, to its automatic position thereby closing a night latch switch 502. Night latch switch 502 includes a switch arm 504 which contacts a terminal 506 to complete the circuit across the night latch switch. With the night latch switch in a closed position, a start-restart circuit is made across arm 474 of the microswitch 284 to the contact 472 of the restart switch 464 and then across the night latch switch 502 and the terminals 388f and 388e of the brake solenoid switch 388 to the solenoid coils 356 and 366 of the drive solenoid switch 346 and the panel solenoid switch 358.

With these setup steps completed, the duplicating machine 10 is now ready for the preduplicating phase of operation.

*Electrical programming unit-"preduplicating phase"*

After the completion of the setup operation, the programming circuit 300 may be selectively energized to control the preduplicating functions of the duplicating machine 10 through the manipulation of the control handle 34 of the preduplicating control unit 32. For purposes of illustration in FIGURE 7, the four positions of the control handle 34 are indicated as A–D, and a single cam representative of the cams 200, 216, and 218 is operated by the handle 34 to actuate microswitches 284, 286, and 508. Switch 508 is a pump and water-on switch which includes a cam operated switch arm 510 and a switch terminal 512.

Referring now to FIGURES 7 and 8, after a lithographic master has been manually secured to the master cylinder 14, the control handle 34 of the preduplicating control unit 32 is moved from the D to the A, or etch, position. This movement of the control handle causes the start microswitch 284 to close so that current flows across the closed switch and from the switch contact 493 through the closed night latch switch 502 and across the contacts 388f and 388e of the brake solenoid switch 388 to energize the solenoid coils 356 and 366 of the drive solenoid switch 346 and the panel solenoid 358. When the solenoid coil 356 of the drive solenoid switch 346 is energized, switch arms 348, 350, and 352 of the drive solenoid switch bridge switch contacts 346a–f and a holding circuit is established back across the contacts 346b–346a of the solenoid switch 346 and then across the contacts 388h–388g of the brake solenoid switch 388 and on through the stop switch 456.

Also, upon the energization of the solenoid coil 356 of the solenoid switch 346, current is caused to flow across the switch contacts 346c–346d and 346f–346e to energize and start a drive motor 514 while simultaneously energizing a batch counter 516.

The now energized solenoid coil 366 of the panel solenoid switch 358 causes the switch arm 362 to bridge the contacts 358b and 358a and establish a holding circuit across these contacts and then across the normally closed contacts 368h–368g of the time delay solenoid switch 368, to the switch arm 518 of the cam operated microswitch 286, to the switch arm 524 of the cam operated feed stop switch 176, to the contact 526 of the end cycle safety switch 192, to the switch arm 522 of the cam operated blanket switch 180, to the contact 410c of the end cycle solenoid switch 410, to the contact 400c of the form off solenoid switch 400, and to the contact 378a of the form on solenoid switch 378. The panel holding circuit is also completed across the contacts 410h–410g of the end cycle solenoid switch 410 to the contact 310 of the master eject switch 304 and across the switch arm 466 of the restart switch 464 to the switch arm 510 of the microswitch 508.

The master cylinder 14 is now being rotated by the drive motor 514 and the lithographic master on the master cylinder will be coated with ink repellent fluid from the etch roller 30 as long as the control handle 34 is maintained in the A position.

When the lithographic master mounted upon the master cylinder 14 is sufficiently coated with ink repellent solution, the control handle 34 of the preduplicating control unit 32 may be moved to the B or ink position as illustrated in FIGURES 7 and 9. In this position, the start microswitch 284 opens, breaking the circuit to the switch contact 473, but the holding circuit across the stop switch 456, the contacts 388g–388h of the brake solenoid switch 388, and the contacts 346a–346b of the drive solenoid 346 operates to maintain the energization of the solenoid coil 356 of the drive solenoid 346 and the solenoid coil 366 of the panel solenoid switch 358. Therefore, the drive motor 514 continues to drive the master cylinder 14 and the panel holding circuit across the panel solenoid switch 358 is maintained.

Also when the control handle 34 is moved to the B position, the form on microswitch 286 is closed causing current to flow across the switch arm 518 to the contact 520. From the contact 520 current then flows to energize the solenoid coil 386 of the form on solenoid switch 378 causing the switch arm 380 to close and bridge the contacts 378a and 378b. Current now passes across the switch arm 380 to energize the form on solenoid 422, thereby causing the lithographic master on the master cylinder 14 to be inked by the form rollers 52 and 54.

After the operator has determined that the lithographic master is sufficiently inked, the control handle 34 may be moved to the image position C which brings the blanket cylinder into contact with the master cylinder so that the blanket cylinder will be mechanically imaged. With the control handle in the image position, the form on microswitch 286 remains closed and the pump and water on microswitch 508 is closed so that current flows across the switch arm 510, as indicated in FIGURES 7 and 10. From the switch arm 510, current flows across the switch contact 512 to energize the water solenoid 424 and cause water to be introduced into the inking system. The solenoid 424 may be connected to a mechanical ductor lockout mechanism, not shown, which is mounted between the sidewalls 12 and 12a of the duplicating machine and which permits the ductor assembly to pivot the ductor roller 60 into variable timed contact with the oscillator roller 56 when the solenoid is energized. The ductor assembly may include many suitable mechanical structures for causing the ductor roller mount to pivot; as, for example, a pair of arms pivoted to the sidewalls 12 and 12a for selectively contacting the ductor roller mounts to move the ductor roller away from the oscillating roller.

Current also flows from the switch contact 512 to energize the solenoid coil 332 of the pump solenoid switch 324. Upon the energization of the solenoid coil 332, the switch arms 326 and 328 close and bridge the switch contacts 324a–324d, thereby causing current to be furnished to power a pump motor 530. With the pump motor 530 in operation, compressed air and also a vacuum to provide suction are furnished to various components of the duplicating machine 10, including, for example, the duplicator sheet feeding unit.

Referring now to FIGURE 7, the preduplicating phase is completed by moving the control handle 34 from the C to the D or feed position. In this position of the control handle, the form on microswitch 286 will open, thereby interrupting the flow of current to the switch contact 520 and resulting in the deenergization of the solenoid coil 386 for the form on solenoid switch 378. The circuit across the solenoid switch contacts 378a and 378b is thereby broken and the form on solenoid 422 is also deenergized, but the form rollers 52 and 54 remain in contact with the lithographic master.

As previously explained, with the control handle 34 in the D or feed position, the mechanical imaging of the blanket cylinder which was completed in the ink position of the control handle is terminated as the blanket cylinder 16 moves away from the master cylinder, and the paper feed is mechanically turned on so that the duplicating machine 10 begins to feed paper.

The preduplicating phase preparation of the programming circuitry 300 is now complete, and the duplicating machine 10 moves into the duplicating phase of operation under the control of the counter assembly 66 and the programming circuitry 300. It is important to note that during the preduplicating phase of operation, the programming circuitry controlled by the manual preduplicating control unit 32 accomplished a step by step energization of the duplicating machine 10. Thus, in retrospect, it may be seen that in the start or A position of the control handle 34, the drive motor 514 was energized to cause rotation of the master cylinder 14, in the B position of the control handle the form rolls were energized, in the C position of the control handle the pump motor was energized, and finally, in the D position of the control handle the paper feed was energized. This step by step energization of the duplicating machine 10 during the preduplicating phase is most important, for it insures that the components of the duplicating machine which draw larger amounts of current upon starting will be individually energized, thereby preventing an overload on the power supply circuit or upon any individual circuit within the programming circuit 300 during machine starting. This permits the installation of the duplicating machine in locations with limited current carrying supply lines.

Automated form roller and night latch assembly

During the preduplicating phase, the programming circuit 300 operates in response to the preduplicating control unit 32 to actuate several novel mechanical components of the duplicating machine 10, and these components are worthy of individual consideration.

First, it will be recalled that when the control lever 34 of the preduplicating control unit 32 was moved to the B or ink position, the form on solenoid 422 was activated. This form on solenoid forms one of the electrical actuating control elements for an automated form roller unit indicated generally at 532 in FIGURES 11 and 12. Basically, the automated form roller unit 532 includes a form roll night latch shaft 534 which extends transversely between the side plates 12 and 12a of the duplicating machine 10. The night latch shaft 534 also projects outwardly from the side plate 12 and supports a night latch control lever 536 which is secured to the terminus of the shaft. The night latch control lever and the night latch shaft may be rotated to three different positions which are determined by a detent cam 538 and a cam follower lever 540. The detent cam 538 is integrally mounted upon the night latch shaft 534 and includes an outer surface with three positioning detents which cooperate with a cam follower 542 mounted upon the cam follower lever 540. The cam follower lever 540 is pivotally mounted upon the side wall 12 by a pivot mount 544 and is biased by a spring 546 extending between the follower lever and a bracket 548 secured to the side wall. The spring 546 biases the cam follower lever 540 so that the cam follower 542 is maintained in contact with the outer surface of the detent cam 538.

Figure 11:
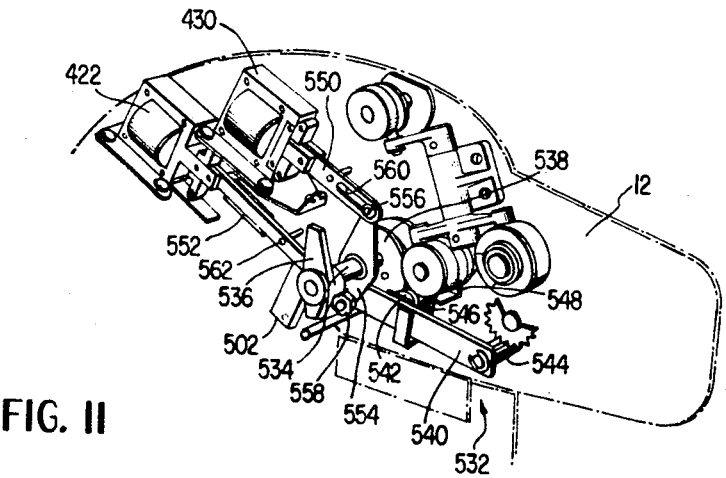
FIGURE 11 is a perspective view of a portion of the automated form roller and night latch assembly of the present invention.

The three detents on the detent cam 538 permit the night latch shaft 534 to be moved and maintained in three separate positions, one of said positions being the center or automatic off position indicated in FIGURE 11. From the automatic off position, in which the night latch control lever 536 is centered, the night latch shaft 534 may be rotated counterclockwise to a night latch position, or from the automatic off position the night latch shaft may be rotated clockwise to a form roll on position. The night latch control lever 536 is manipulated manually to move the night latch control shaft to the night latch position or to move the night latch control shaft from the night latch to the automatic off position, but subsequently, the night latch control shaft may be moved from the automatic off position to the form roll on position either manually or by the form on solenoid 422.

The form on solenoid 422 and the form off solenoid 430 are mounted upon the side wall 12 and are linked to the night latch control shaft 534 by solenoid operating links 550 and 552. These solenoid links are in turn connected to a double arm actuator 554 which is integrally secured to the night latch shaft 534, the solenoid link 550 of the form off solenoid 430 being attached to the double arm actuator above the night latch shaft by a pin at 556 while the solenoid link 552 is secured to the double arm actuator below the night latch shaft by a pin at 558. Link 550 is provided with a slot 560, which permits the connecting pin 556 to slide relative to the link when the night latch shaft 534 is manually moved to the full counterclockwise or night latch position. As the night latch shaft is manually moved to the night latch position, counterclockwise movement of the shaft causes the double arm actuator 554 to pull on the solenoid link 552 and bring a bracket 562 on the solenoid link into contact with the night latch switch 502. Night latch switch 502 is mounted up on the side plate 12 and, when contacted by the bracket 562 as the night latch shaft moves into the night latch position, opens to open the circuit across the night latch switch and prevent further operation of the duplicating machine 10. Manual setting of the night latch shaft 534 to the automatic off position causes the bracket to move away from the night latch switch 502 and the night latch switch is thereby closed so that the programming circuit 300 of the duplicating machine may be subsequently energized.

Figure 12:
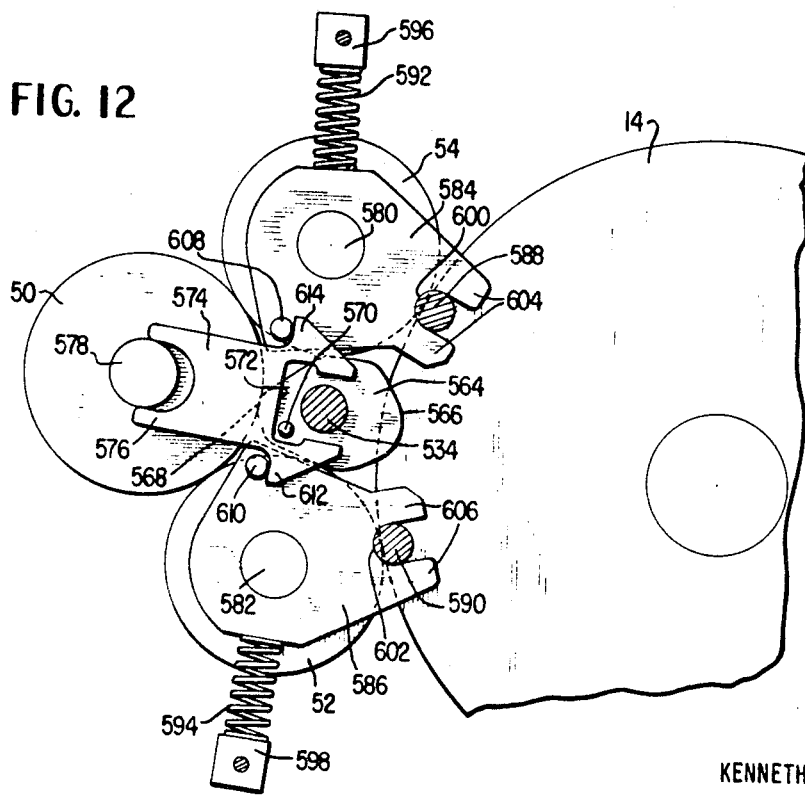
FIGURE 12 is a view in side elevation of a portion of the automated form roller and night latch assembly of the present invention.

The automated lower and upper ink form rollers 52 and 54 are positioned relative to the master cylinder 14 and the oscillating roller 50 in accordance with the position of the night latch shaft 534, and this positioning of the form rollers is accomplished by the mechanism illustrated in FIGURE 12. Referring to FIGURE 12, the mechanism at one side of the duplicating machine 10 for operating the form rollers 52 and 54 is illustrated, and a similar mechanism, not shown, provided on the remaining side of the duplicating machine at the opposite end of the night latch shaft 534 operates in the same manner under the control of the night latch shaft.

Secured to the night latch shaft 534 is a cam 564 having raised cam surfaces 566 and 568. The cam 564 also supports a projecting pin 570 which contacts and moves about an inner cam surface 572 formed on a sliding link 574. The end of the sliding link 574 opposite the cam surface 572 is bifurcated, as indicated at 576 to provide two legs which extend about a hub 578 for the oscillating roller 50. The bifurcated end 576 of the sliding link 574 permits the link to be moved toward or away from the hub 578.

The form rollers 52 and 54 are mounted upon roller shafts 580 and 582 which in turn are supported by form roller levers 584 and 586. The form roller levers 584 and 586 are mounted on the side walls of the duplicating machine 10 by means of pins 588 and 590 which extend inwardly from the side walls and springs 592 and 594 which are maintained in spring mounts 596 and 598 also secured to the side walls of the duplicator machine. The form roller levers 584 and 586 are each provided with a bifurcated portion indicated at 600 and 602 which results in projecting legs 604 and 606 extending upon either side of the pins 588 and 590. The springs 592 and 594 contact the form roller levers 584 and 586 and bias the bifurcated surfaces 600 and 602 into contact with the pins 588 and 590. However, the form roller levers may be either moved away from the pins 588 and 590 or pivoted about the pins against the bias of the springs 592 and 594. This is accomplished by rotation of the cam 564 which contacts the form roller levers.

It will be noted that each of the form roller levers is provided with a projecting pin as indicated at 608 and 610. The pins 608 and 610 contact ears 612 and 614 on the sliding link 574. It is apparent that as the sliding link moves toward the oscillator roller hub 578, the ears 612 and 614 contact the pins 608 and 610 and move the form roller levers 584 and 586 away from the pins 588 and 590 against the bias of the springs 592 and 594.

In the operation of the night latch unit 532, when the form on solenoid 422 is energized, the solenoid link 552 pulls on the double arm actuator 554 to rotate the night latch shaft 534 to the full clockwise or form on position, as shown in FIGURE 11, which illustrates the left side of the duplicating machine. In this position of the night latch shaft, the sliding link 574 permits both the upper and the lower form rollers 54 and 52 to engage the master cylinder 14 while the springs 592 and 594 maintain the upper and lower form rollers in contact with the oscillating roller 50, as indicated in FIGURE 12. FIGURE 12 illustrates the right-hand side of the duplicating machine and the elements shown therein are reversed in position with respect to the showing of FIGURE 11.

When the form off solenoid 430 is energized, the solenoid link 550 pulls on the double arm actuator 554 and rotates the night latch shaft 534 counterclockwise one step to the automatic off or central position indicated in FIGURE 11. As the night latch shaft rotates counterclockwise (clockwise in FIGURE 12) for one step, the cam 564 also rotates clockwise moving the pin 570 upwardly along the cam surface 572 of the sliding link 574. This movement of the pin 570 causes the sliding link to move toward the oscillating roller hub 578, and the ears 612 and 614 on the sliding link contact the pins 608 and 610 on the form roller levers 584 and 586. Thus the rearward movement of the sliding link causes the ears 612 and 614 to move the form roller levers 584 and 586 back away from the master cylinder 14 against the bias of the springs 592 and 594. This movement of the form roller levers moves the form rollers 52 and 54 out of contact with the master cylinder while maintaining the form rollers in contact with the oscillating roller 50.

When it becomes desirable to keep the electrical programming circuitry 300 of the duplicating machine in a deenergized state, the night latch control handle 536 is manually rotated to the full counterclockwise, night latch position. This causes the double arm actuator 554 to pull the solenoid link 552 forward so that the bracket 562 contacts and opens the night latch switch 502 to maintain the programming circuit 300 in an open circuit condition.

The counterclockwise movement of the night latch control handle 536 (FIGURE 11) causes a corresponding counterclockwise (clockwise in FIGURE 12) movement of the night latch shaft 534 and the cam 564 so that the raised cam surfaces 566 and 568 on the cam surface contact the form roller levers 584 and 586 and rotate the levers outwardly about the pins 588 and 590 against the bias of the springs 592 and 594. This outward movement of the form roller levers moves the form rollers 52 and 54 outwardly away from contact with the oscillating roller 50 so that in the night latch position, the form rollers do not contact either the oscillating roller or the master cylinder 14.

As has been previously noted in the setup procedure for the duplicating machine 10, the night latch and automated form roller unit 532 is prepared for operation by manually moving the night latch control handle 536 from the night latch to the automatic off position. At this point, the night latch switch 502 is closed and the programming control circuit 300 can subsequently operate to energize the form on solenoid 422 and the form off solenoid 430 in the manner previously described.

*Electrical programming unit-duplicating phase*

Figure 13:
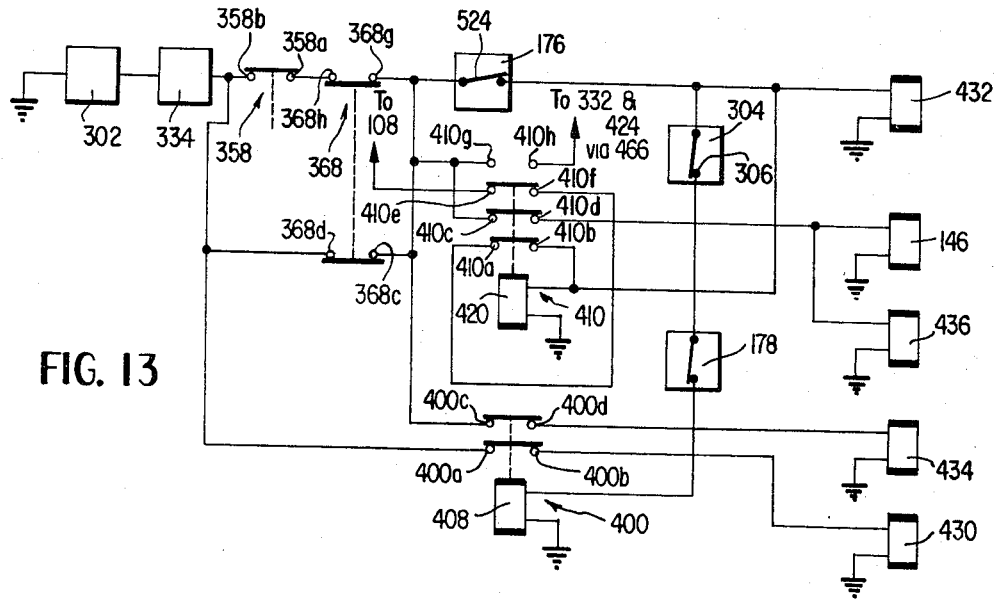
FIGURE 13 is a circuit diagram illustrative of a portion of the circuit of FIGURE 7.

With reference to FIGURES 7 and 13, after the preduplicating phase of operation is completed by the programming circuit 300, the duplicating machine is prepared for the duplicating phase of operation during which single copy sheets are removed from the sheet-feeding table 20, fed through the machine and subsequently discharged as printed copy sheets into the receiving tray 24. As each copy sheet is fed through the duplicating machine, the counter assembly 66 operates in the manner previously described and the feed stop, eject, and blanket wash cams 182, 184, and 186, move toward the switches 176, 178, and 180.

The copy sheets continue to feed through the machine until the predetermined number of sheets is registered by the counter assembly, and the feed stop cam 182 contacts and closes the feed stop switch 176. Closing of the feed stop switch 176 causes current to flow across the switch arm 524 to energize the feed off solenoid 432. The feed off solenoid 432 is connected by means of the link 246 (FIG-6) to the sheet feed control handle 22, and energization of this solenoid causes the feed control handle to move to the off position, thereby terminating the operation of the sheet feed mechanism for the duplicating machine.

*Electrical programming unit-postduplicating phase*

With the closing of the feed stop switch 176, current is provided to the switch contact 410b and the solenoid coil 420 of the end cycle solenoid switch 410. Energization of the solenoid coil 420 causes the solenoid switch to close and results in an open circuit across solenoid switch contacts 410g and 410h while a circuit is completed across all the switch contacts 410a to 410f.

The completion of the circuit across the contacts 410a–410b results in the establishment of a holding circuit extending from switch 334 across the contacts 368c–368d and the contacts 410a–410b to the solenoid coil 420. Also, the breaking of the circuit across the contacts 410g–410h will cause current to be interrupted to the solenoid coil 332 of the pump solenoid switch 324 and to the water solenoid 424 so that the pump motor 530 is de-energized and simultaneously the supply of water or etching fluid to the form rollers and master cylinder is discontinued (FIGURE 10).

In addition to establishing the holding circuit across the solenoid switch terminals 410a–410b, the closing of the solenoid switch 410 causes current to flow across the switch terminals 410c–410d to energize the cycle count solenoid 146 and the ink ductor solenoid 436. The ink ductor solenoid is an optional solenoid which may be mechanically connected to prevent the ink fountain roller 38 from contacting the ink ductor roller 40, thereby positively terminating the supply of ink to the form rollers.

After the last copy sheet is printed and the cycle count is initiated by the cycle count solenoid 146, the eject cam 184 closes the eject switch 178 to permit current to flow across the master eject switch 304 to the master eject switch terminal 306, and then across the closed eject switch 178 to the solenoid switch coil 408 of the form off solenoid switch 400. The energization of the solenoid coil 408 results in the completion of a circuit across the solenoid switch contacts 400a to 400d, and current flowing across the contacts 400a–400b energizes the form off solenoid 430 to cause the form rollers to be removed from the master cylinder 14. Simultaneously, current flowing across the switch contacts 400c–400d energizes the eject solenoid 434 which is mechanically connected to a suitable mechanical eject mechanism of the type known to the art. This eject mechanism operates to accomplish the mechanical ejection of the lithographic master from the master cylinder 14 at the instant the form rollers are removed from contact with the master cylinder by the energization of the form off solenoid 430. The lithographic master must not be ejected until the cycle count is started, and ejection normally follows the first cycle count after the last copy sheet is fed. The master must not be ejected while the last copy sheet is printed, as this would result in the transfer of the blanket image to a bare master cylinder and an ink pileup thereon.

Figure 14:
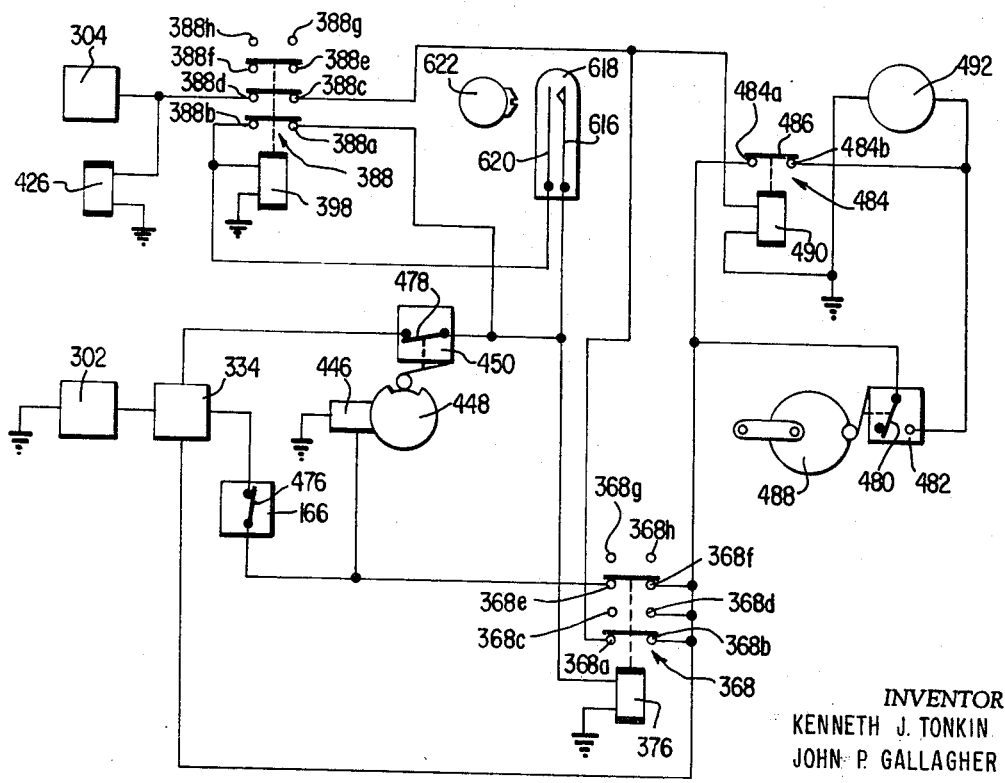
FIGURE 14 is a circuit diagram illustrative of a portion of the circuit of FIGURE 7.

With the ejection of the lithographic master and the termination of sheet feed through the duplicating machine 10, the duplicating phase of operation is complete and the energization of the cycle count solenoid 146 causes the counter assembly 66 to begin a cycle count and initiate the postduplicating operational phase of the duplicating machine. As may be noted from FIGURES 7, 13, and 14, when the counter assembly 66 registers the cycle count succeeding master ejection, the blanket wash cam 188 moves into contact with the blanket wash switch 180 and closes the switch arm 522 (FIGURE 7). Current is then permitted to flow across the blanket wash switch 180 to energize the blanket wash solenoid 428 and, consequently, cause the previously imprinted image to be removed from the blanket cylinder 16. This blanket wash function may be performed mechanically by a conventional blanket wash roller (not shown) which is mounted to be moved into contact with the blanket cylinder 16 either manually or by the blanket wash solenoid 428.

At approximately the same time as the closing of the blanket wash switch 180, the eject cam 184 causes the eject switch 178 to open, thereby interrupting the circuit to the solenoid coil 408 of the form off solenoid switch 400. With the solenoid coil 408 de-energized, the circuit is broken across the solenoid switch contacts 400a–400b, and 400c–400d, thereby resulting in the de-energization of the form off solenoid 430 and the eject solenoid 434.

Also at approximately the same time as the closing of the blanket wash switch 180, the feed stop cam 182 moves away from the feed stop switch 176 causing the switch arm 524 to break the circuit across the feed stop switch. However, the holding circuit across the contacts 410a to 410b of the end cycle solenoid switch 410 maintains the energization of the solenoid coil 420 and the feed off solenoid 432.

The counter assembly 66 then continues to register a count for each rotation of the impression cylinder 18 during the postduplicating phase, and the cam bank 164 continues advancing until the preset blanket wash count is reached. At this point, the stop cam 162 will contact and close the stop switch 166 and current will flow across the switch arm 476 to energize the timing motor 446 and initiate the rotation of the timing motor cam 448 which operates to cose the switch arm 478 of the timing switch 450. The timing motor 446 causes the cam 448 to complete a cycle of rotation of a duration greater than the duration of one revolution of the duplicating machine at 10 at its slowest operating speed, thereby maintaining the circuit across the timing switch 450 for an interval greater than the time taken by the impression cylinder 18 to complete one revolution. As will be apparent from a consideration of FIGS. 7 and 14, closure of the switch 450 causes current to flow across the switch arm 478 to energize the solenoid coil 376 of the time-delay solenoid switch 368. Current will also flow across the timing switch 450 to the reed switch arm 616 of a pulsed magnetic switch 618. The switch arm 616 is caused to contact a switch contact 620 of the magnetic switch when a magnetic actuator 622 rotates past the switch arm 616. Magnetic actuator 622 is caused to rotate with the rotation of the blanket cylinder 16 of the duplicating machine 10 in a manner to be subsequently described.

As the switch arm 616 of the magnetic switch 618 contacts the contact 620 during the time delay closure interval of the timing switch 450, a pulse of current is permitted to pass across the magnetic switch 618 to the solenoid coil 398 of the brake solenoid switch 388. This pulse is so timed by the magnetic actuator 622 that the brake solenoid switch 388 will actuate a mechanism to brake the duplicating machine and position the master cylinder 14 in the proper position for reloading.

Upon the reception of an energizing pulse by the solenoid switch coil 398, the brake solenoid switch 388 will close, causing a circuit to be completed across contacts 388a to 388d, and breaking the previously completed circuits across contacts 388e to 388h. The formation of the circuit across the brake solenoid switch contacts 388a–388b causes a holding circuit to be completed from the timing switch 450 to the solenoid coil 398 for the duration of the time delay cycle of the timing switch.

Referring again to the time-delay solenoid switch 368, it will be noted that when the solenoid coil 376 is energized, several operations occur simultaneously. First, the circuit across the solenoid switch contacts 368c–368d is broken, thereby interrupting the flow of current through the switch arm 500 of the count switch 442 to the counter clutch solenoid 108, and the counter clutch solenoid is therefore de-energized to allow the cam bank 164 to be returned to the start position by the return spring 100 in the counter assembly 66. Additionally, the interruption of current flow across the contacts 368c–368d causes the light 440 in the count switch 442 to go out and the holding circuit across the contacts 410a–410b of the end cycle solenoid switch 410 is interrupted, thereby resulting in the de-energization of the end cycle solenoid switch coil 420.

With the interruption of the circuit across the time-delay solenoid switch contacts 368c–368d, a circuit is established across the contacts 368a–368b and current is subsequently supplied to the timing motor 446 across these contacts during the remainder of the time delay period when the timing switch 450 is closed but after the stop switch 166 has been released by the return of the stop cam 162 with the cam assembly 164.

The energization of the solenoid coil 376 also results in the interruption of the circuit across the contacts 368g–368h of the time-delay solenoid switch, thereby opening the panel holding circuit to the switches 286, 508, 180, 176, 464, and 304. (FIG. 8). This interruption of the holding circuit permits the switches 178, 180, and 176, which are contacted by the cams in the cam bank assembly 164 as the cam bank assembly resets, to be mechanically contacted without permitting any electrical switching to take place within the programming circuit 300 as the result of such contact.

As the circuit across contacts 368c–368d of the time-delay solenoid switch 368 opens, a circuit is completed across the contacts 368a–368b, thereby providing a path for current flow across the contacts 388c–388d of the brake solenoid switch 388 and also resulting in the energization of solenoid coil 490 of the jogging motor solenoid switch 484. The energization of the solenoid coil 490 causes the switch arm 486 to bridge the contacts 484a–484b of the jogging motor solenoid switch and power is supplied to energize the jogging motor 492. The jogging motor is mechanically connected to the jogging switch control cam 488, and rotates the cam to close the switch 482. After the time delay period when the switch 450 is closed has elapsed, current to the solenoid switch coil 490 is cut off, but, in the intervening interval, the jogging control cam 488 has caused the jogging control switch 482 to close completing a current across the switch arm 480 to the jogging motor 492. Thus the jogging motor continues to rotate until the cam 488 opens the switch 482, and the cam is designed to maintain energization of the jogging motor for a slight period beyond the point at which the timing switch 450 opens.

With the flow of current across the solenoid switch contacts 388c–388d of the brake solenoid 388, current is provided to energize the brake on solenoid 426 and the master cylinder brake is actuated to mechanically terminate the rotation of the master cylinder 14. Simultaneously, contacts 388g–388h of the brake solenoid switch are opened to interrupt current flow to the holding circuit across contacts 346a–346b of the drive solenoid switch 346 and the solenoid switch coil 356 is deenergized. The discontinuance of current flow in the holding circuit de-energizes the drive solenoid switch 346 and the panel solenoid switch 358, and the drive motor 514 is stopped, causing a count to register on the batch counter 516. Also, the switch solenoid contacts 388e–388f of the brake solenoid switch 388 are now open to prevent the drive motor from being accidentally started during the braking of the master cylinder 14.

When the timing cam 448 has completed a cycle of rotation, the timing switch 450 is opened to interrupt the flow of current to the solenoid coil 376 of the time-delay solenoid 368 and de-energize the time-delay solenoid. The de-energization of the time-delay solenoid results in the opening of the contacts 368e–368f and the stopping of the timing motor 446. Also, contacts 368a–368b of the time-delay solenoid open interrupting the flow of current to the solenoid coil 490 of the jogging motor solenoid switch 484 and also to be the brake solenoid switch 388. The solenoid switch coil 398 of the brake solenoid switch becomes de-energized breaking the circuit across the switch contacts 388c–388d and de-energizing the brake on solenoid 426, while simultaneously circuits are re-established across the solenoid switch contacts 388e to 388h of the brake solenoid switch to re-establish the starting and holding circuit to the drive solenoid switch 346.

As the circuit opens across the solenoid switch contacts 368a–368b of the time-delay solenoid switch, the circuit is re-closed across the contacts 368c–368d, and the light 440 of the count switch 442 is again illuminated. The duplicating machine 10 has now completed a duplicating run and is ready for reloading.

Master cylinder brake unit

It has been noted that during the post duplicating phase of operation for the duplicating machine 10, the electrical programming circuit 300 acts to initiate and control the operation of several novel mechanical components of the deuplicating machine. Among these components which are worthy of particular consideration is the master cylinder brake unit which operates under the control of the magnetic switch 618 when the timer switch 450 is closed to mechanically terminate the rotation of the master cylinder 14 so that the master cylinder will be properly positioned for reloading.

Figure 15:
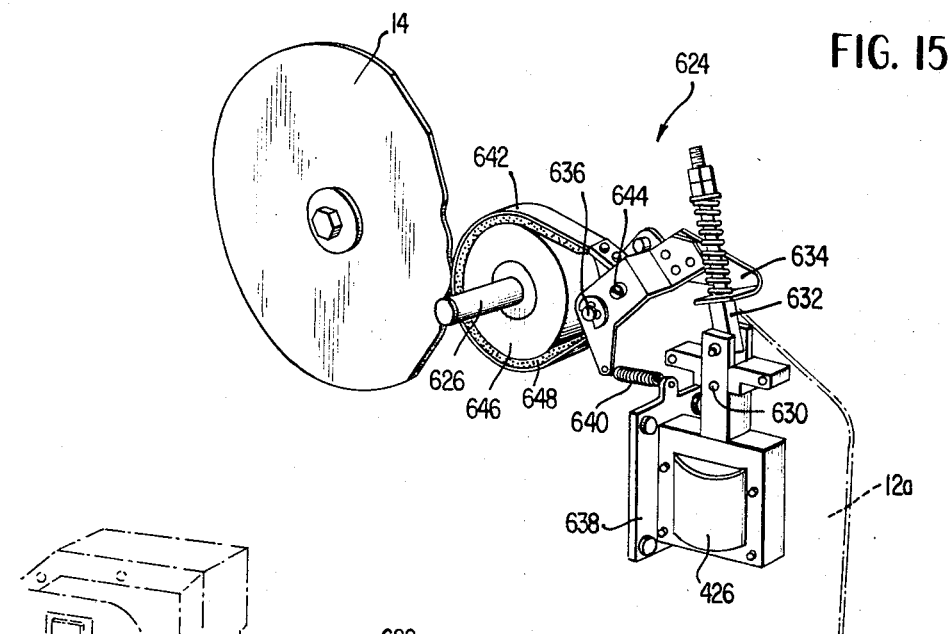
FIGURE 15 is a perspective view of a portion of the master cylinder brake unit of the present invention.
Figure 16:
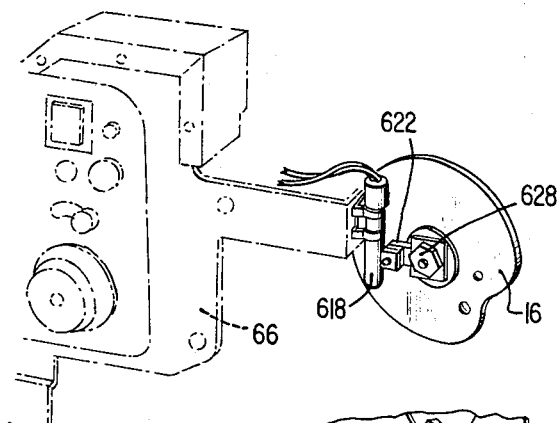
FIGURE 16 is a perspective view of a portion of the control mechanism for the master cylinder brake unit of the present invention.
Figure 17:
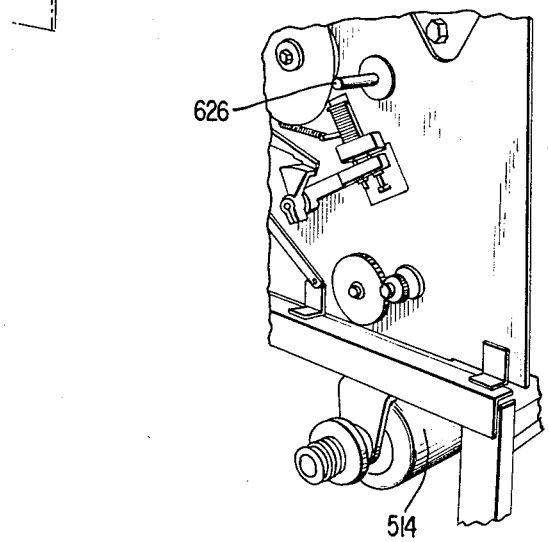
FIGURE 17 is a perspective view of a portion of the duplicator drive system for the offset lithographic duplicating machine used with the present invention.

Referring now to FIGURES 15–17, the master cylinder brake unit indicated generally at 624 is mounted upon the side wall 12a of the duplicating machine 10. The master cylinder brake operates to brake the drive shaft 626 for the master and blanket cylinders which is mounted for rotation between the side walls 12 and 12a. The drive shaft 626 carries gear units, not shown, which mesh with gear sections on the master and blanket cylinders in a conventional manner and operate to drive the master and blanket cylinders in timed relationship upon rotation of the drive shaft 626. The outer end of the drive shaft 626, shown in FIGURE 17, carries a drive clutch, pulley, or similar member which is linked to the drive motor 514 by means of a drive belt, chain, or other driving linkage. Thus, when the drive motor 514 is energized, driving power is transmitted to the drive shaft 626 which in turn initiates rotation of the master and blanket cylinders in timed relationship. It must be understood that although the master cylinder brake unit 624 is shown in use with a separate drive shaft 626 in FIGURES 15 and 17, the same braking unit may be employed on the shaft of either the master or blanket cylinder if the cylinders are driven directly from the drive motor 514.

Turning now to FIGURES 15 and 16, it will be noted that the magnetic reed switch 618 is mounted upon the counter assembly 66 so as to be positioned adjacent one end of the blanket cylinder 16. Mounted upon the end of the blanket cylinder by a mounting device 628 is the magnetic switch actuator 622, and it will be come apparent from a consideration of FIGURE 16 that as the blanket cylinder shaft rotates, the magnetic actuator 622 rotates clockwise causing the actuator to pass by the magnetic switch 618. During the time period when the magnetic actuator is adjacent the switch 618, the contacts of the switch will close to activate the brake on solenoid 426 in the manner previously described. As the blanket cylinder 16 and the master cylinder 14 rotate in a one to one relationship and the magnetic actuator 622 passes adjacent the magnetic switch 618 at the same point during each cycle of rotation, the brake on solenoid 426 will always be energized at the same point in the rotational cycle of the master cylinder to stop the master cylinder at this location during each braking cycle. In instances where variations occur in the rotation of the master and blanket cylinders, such as variations in speed, the device 628 may be adjusted so that the position of the magnetic actuator 622 can be altered to compensate for such variations. Thus the position of the braking point for the master cylinder is maintained for all speeds of operation.

Although the magnetic switch 618 is closed upon each revolution of the blanket cylinder 16, the magnetic switch is maintained electrically inactive until the two-second timing switch 450 is closed during the braking cycle initiated by the programming circuit 300.

The brake on solenoid 426 includes a solenoid plunger 630 which is connected by means of an arm 632 to a pivoted link 634. Link 634 is pivoted about a pivot pin 636 extending from the side wall 12a of the duplicating machine. One end of the link 634 is connected to the arm 632, while the remaining end is secured to a solenoid mount 638 by means of a spring 640. The solenoid mount 638 is in turn attached to the side wall 12a of the duplicating machine.

The free ends of a brake band 642 are connected to the pivoted link 634 at a point between the arm 632 and the pivot pin 636 by means of a suitable attachment indicated at 644. The brake band is adapted to grip a brake hub 646 mounted upon the drive shaft 626 when the braking unit 624 is actuated, and the surface of the brake band adjacent the hub may be lined with any suitable friction brake facing 648.

In the operation of the master cylinder braking unit 624, when the brake on solenoid 426 is activated, the plunger 630 moves the arm 632 downwardly, thereby pulling the link 634 clockwise about the pivot pin 636. This movement tightens the brake band 642 to cause the brake band to tightly grip the brake hub 646, thereby stopping the drive gears carried by the drive shaft 626 and the master and blanket cylinders.

When the brake on solenoid 426 is deactivated, the spring 640 pulls the link 634 counterclockwise about the pivot pin 636 to release the tension on the brake band 642 and permit rotation of the drive shaft 626.

The duration of the braking cycle is visually indicated by the light 440, which is extinguished at the time the circuit is completed to the magnetic switch 618 and which is again illuminated when the brake on solenoid 426 is deactivated.

Jogging receiving tray

The copy sheet receiving tray 24 employed with the duplicating machine 10 is a removable sheet receiving tray which may be formed by the conventional type of stationary receiving tray normally employed with offset duplicating machines. Preferably, however, the sheet receiving tray 24 employed with the offset duplicating machine and programming circuit of the present invention constitutes a jogging receiving tray which shifts about a vertical axis between one of two tray positions at the end of each post-duplicating phase of operation accomplished by the duplicating machine. This programmed shifting of the receiving tray 24 causes copy sheets which are fed into the tray from a duplicating run to be angularly offset from copy sheets fed into the tray from the preceding and succeeding duplicating runs. The tray sides 25 are positioned to permit the sheets to be angularly offset and to come to rest. Copy sheets from a plurality of successive duplicating runs may be fed into the receiving tray and maintained segregated from other groups of copy sheets.

Referring to FIGURES 18 and 19, the jogging sheet receiving tray 24 includes a subtable 650 which is provided with an undercarriage 652 adapted to cooperate with mounting elements on the duplicating machine 10. The carriage 652 includes cutaway sections 654 which permit the carriage to be secured to the duplicating machine 10 so that the subtable 650 is firmly retained on the duplicating machine. It is obvious that a pivoted latch or any suitable conventional locking means for releasably connecting the carriage 652 to the duplicating machine may also be employed.

An upper receiving tray 656 is mounted in spaced relationship above the subtable 650, and is pivoted relative to the subtable on a vertical pivot pin 658 which is pivoted relative to the subtable and secured to the upper receiving tray. It is obvious that additional support means, not shown in FIGURE 18, which will permit relative movement between the upper receiving tray and the subtable may be provided to maintain the upper receiving tray in spaced relationship with the subtable.

The shifting of the upper receiving tray 656 relative to the subtable 650 is accomplished by the jogging motor 492 which is mounted below the subtable. The shaft of the jogging motor 492 extends through the substable and mounts the cam actuator 488 for rotation between the subtable and the upper receiving tray. The cam actuator 488 is linked to the upper receiving tray by a bell crank driving linkage which includes a first link 660 having one end pivotally secured to an eccentric pivot 662 on the face of the cam actuator. The opposite end of the link 660 is pivotally secured to a pivot pin 664 which is secured to one end of a second link 666, the other end of which is secured to the pivot pin 658.

It will become apparent from a consideration of FIGURE 19, that when the jogging motor 492 is energized by the programming circuit 300 in the manner previously described, the rotation of the cam 488 causes the first link 660 to pull upon the pin 664 and shift the upper receiving tray 656 so that the receiving tray is shifted symmetrically about the central longitudinal axis of the copy sheet being delivered from the duplicating machine 10. This is accomplished by positioning the pivot pin 658 on a line passing along the central axis of the copy sheet as shown in FIGURE 19.

The jogging motor 492 is a one-half cycle reciprocating motor which causes the cam 488 to move the bell crank linkage back and forth between the dotted and solid lines positions in FIGURE 19. The programming circuit 300 must energize the jogging motor 492 during two succeeding postduplicating phases of the duplicating machine to complete a cycle of movement of the bell crank linkage from the solid line position to the dotted line position and back to the solid line position in FIGURE 19.

When the jogging motor 492 and the jogging motor switch 482 are mounted upon the subtable 650 in the manner illustrated in FIGURES 18 and 19, the electrical connection between the jogging motor and jogging motor switch and the remainder of the programming circuit 300 may be accomplished by means of a plug 668. This plug is positioned on the carriage 652 so that the plug may be mated with a suitable socket on the duplicating machine 10 when the jogging tray 24 is mounted in place upon the duplicating machine. Thus, a circuit is completed between the electrical components supported upon the carriage 652 and the remainder of the programming circuit 300 mounted upon the duplicating machine.

*Emergency stop and restart*

The electrical programming circuit 300 is designed to promote versatility in machine operation while also providing rapid and effective control during emergency conditions. Before considering the various additional modes of operating the duplicating machine 10 with the programming circuit, the emergency machine controls incorporated within the programming circuit will first be described.

Referring back to FIGURE 7, when an emergency condition arises during the preduplicating, duplicating or postduplicating phases of the duplicating machine, the stop switch 456 may be depressed to interrupt the holding circuit across the switch arm 454 (FIGURE 8). This interruption of the holding circuit across the stop switch will cause the solenoid coil 356 of the drive solenoid switch 346 to become de-energized, and the drive solenoid switch will open to break the circuit to the drive motor 514 and also to the solenoid coil 366 of the panel solenoid switch. With the solenoid coil 366 de-energized, the panel solenoid will also open breaking the circuit across the switch contacts 358a–358b and de-energizing the solenoid coil 332 of the pump solenoid switch 324 (FIGURE 10). As the pump solenoid switch opens, the circuit is broken to the pump motor 530 and the duplicating machine 10 comes to a complete stop.

Also, when the stop switch 456 is depressed, the switch arm 454 completes the circuit to a switch terminal 460 and current will flow across the switch arm 454 to energize the form off solenoid 430. Energization of the form off solenoid causes the form rolls to be moved out of contact with the master cylinder 14.

It should be noted that the depression of the stop switch 456 does not reset the sheet counter assembly 66, and therefore the stop switch may be operated at any time during the duplicating or postduplicating phases of operation of the duplicating machine 10 without resulting in a cancellation of the sheet count previously registered upon the counter assembly. This feature is of utmost importance, for it permits the duplicating machine to be stopped at any point during a duplicating cycle of operation without interrupting the normal sequence of programmed operation.

After an emergency stop has been completed through the use of the stop switch 456, the mechanical feed lever 22 should be moved manually to the off position if the duplicating machine operation was interrupted during the duplicating cycle when paper feeding occurs. Otherwise, the duplicating machine 10 may be immediately restarted by depressing the restart switch 464 to cause a circuit to be completed across the switch arm 462 to the switch contact 472. Closing the circuit across the restart switch will cause current to flow across the night latch switch 502 and the contacts 388f–388e of the brake solenoid switch 388 to re-energize the solenoid coils 356 and 366 of the drive solenoid switch 346 and the panel solenoid switch 358. As the drive solenoid switch and panel solenoid switch again close, the drive motor 514 is started and the circuit of FIGURE 8 is completed.

Additionally, the restart switch 464 completes a second circuit which extends across the switch arm 466 to the switch terminal 470, and current is thereby permitted to flow through the solenoid switch coil 386 of the form on solenoid switch 378. As the form on solenoid switch is energized, current flows across the switch contacts 378a–378b to energize the form on solenoid 422 and bring the form rolls back into contact with the master cylinder 14.

When the restart switch 464 is released, the switch arm 466 will again complete the circuit to the switch terminal 468 and the pump solenoid switch 324, the pump motor 530, and water solenoid 424 are again energized (FIGURE 10). It is important to note that on restart, the programming circuitry 300 again operates to sequentially energize the components of the duplicating machine, such as the drive and pump motors, which place a heavy load on the power supply to prevent circuit overload.

After the release of the restart switch 464, the feed lever 22 should again be turned to the on position to reinitiate sheet feeding through the duplicating machine 10. The counter assembly 66 will then resume counting the copy sheets passing through the duplicating machine at the point from which the count was previously terminated.

If the operation of the duplicating machine 10 is interrupted by the stop switch 456 after the lithographic master has been ejected from the master cylinder 14, the depression of the restart switch 464 will not result in current flow across the switch arm 466 to the switch terminal 470 and the subsequent activation of the form on solenoid switch 378. If the form on solenoid switch were activated after the ejection of the lithographic master, the form on solenoid 422 would be energized causing the form rollers to contact and ink the bare master cylinder.

It will be noted, with reference to FIGURE 13, that when the lithographic master has been ejected from the master cylinder 14, the end cycle solenoid switch 410 is activated and the current flow to the switch arm 466 of the restart switch 464 is broken by the interruption of the circuit across the solenoid switch contacts 410g–410h of the end cycle solenoid switch. Thus, it is impossible to restart the pump motor 530, or to energize the water solenoid 424 and the form on solenoid 422 after the lithographic master has been ejected, and depression of the restart switch 464 will result only in the restarting of the drive motor 514 and the energization of the components of the programming circuit 300 which are required to complete the postduplicating phase of operation.

*Random runs*

Although the duplicating machine 10 may be completely controlled, as has previously been described, by the programming circuit 300, it is desirable to adapt the programming circuit to permit universal operation so that the duplicating machine may be employed to accomplish a wide variety of duplicating operations which are not adapted to be controlled by the normal operation of the programming circuit.

The first special operation of the duplicating machine to be considered is the employment of the machine to accomplish random runs wherein a varying number of copy sheets are to be produced during the duplicating cycle of the machine or where it is desirable to prolong the duplicating cycle to provide a number of copy sheets greater than the number adapted to be registered by the sheet counter assembly 66.

For random runs, the duplicating machine 10 may still be operated in an automatic manner. First the mechanical counter assembly 66 is set so that the sheet count control knob 86 is positioned adjacent the number one indicator in the one sheet count position. This positioning of the control knob causes the lug 190 on the gear segment 92 to contact and close the end cycle safety switch 192, so that the switch arm of the end cycle safety switch completes the circuit to the switch contact 526 (FIG. 7).

With the end cycle safety switch 192 closed, the count switch 442 is opened to cause the switch arm 500 to move away from the switch contact 498, thereby breaking the circuit across the count switch. This interruption of the circuit across the count switch extinguishes the pilot light 440 and the counter clutch solenoid 108 cannot be energized. Thus sheets that are fed through the duplicating machine will not be counted by the counter assembly 66, and any number of sheets may be passed through the duplicating machine during the duplicating phase of operation.

With the counter assembly 66 deactivated, the duplicating machine 10 can be programmed through the preduplicating and into the duplicating phase of operation by the preduplicating control unit 34 in the manner previously described. When the desired number of copy sheets have been fed through the machine, the machine cannot be automatically passed to the postduplicating phase of operation by the deactivated counter assembly, and therefore, the postduplicating phase of operation must be manually initiated by closing the end cycle switch 670 (FIG. 7). The end cycle switch 670 includes a switch arm 672 and a switch contact 674 which is electrically connected to the end cycle safety switch 192. When the end cycle switch is closed and the circuit is completed by the switch arm 672 to the contact 674 and to the closed end cycle safety switch 192, current will flow across the end cycle safety switch and the end cycle switch to energize the feed off solenoid 432. The feed off solenoid in turn operates in the manner previously described to terminate the paper feed through the duplicating machine.

Current also flows across the switch arm 672 to the coil 420 of the end cycle solenoid switch 410 causing the end cycle solenoid switch to close and initiate the normal programmed postduplicating phase of machine operation.

*Automatic overchute*

At times it may be desirable to feed a random number of copy sheets through the duplicating machine 10 and then, in the same duplicating phase of operation, to feed a fixed number of copy sheets from the sheet table 20. To provide for an operation of this type, an automatic overchute table 682 (FIG. 20) containing a random number of copy sheets may be positioned on top of the copy sheets carried by the sheet table 20 so that the random sheets are first fed from the overchute table. The overchute table may be of a type conventional to offset duplicating machines which has been modified so that when such table is attached to the duplicating machine 10, it operates to connect a normally closed overchute switch 676, which is mounted upon the overchute table, into the programming circuit 300, as indicated by the connection 684 in FIGURE 7. The overchute switch includes a switch arm 678 which contacts a switch terminal 680 to complete the circuit across the overchute switch when an empty overchute table is mounted upon the duplicating machine. However, the subsequent loading of copy sheets onto the overchute table causes the overchute switch to open, and the switch arm 678 does not again contact the terminal 680 until all of the copy sheets have been fed from the overchute table.

The mechanical construction of the overchute table 682 may best be understood by reference to FIGURE 20 illustrating the overchute table which includes a bed 686 and two adjustable side guides 688 supported on the base, also extending upwardly from one side of the overchute table is an L-shaped bracket 690 which supports the overchute switch 676 above the table bed at a point between the side guides 688. The overchute switch includes a switch actuating arm 692 which projects downwardly from the switch through a slot 694 formed in the table bed. The overchute switch is electrically connected to the programming circuit 300 by a conductor 696 which extends to a plug or other suitable connector (not shown). This connector operates to make the circuit connection at 684 (FIG. 7) when the overchute table is positioned on the sheet feed table 20.

After the overchute table is mounted upon the duplicating machine 10, the count switch 442 is opened so that the light 440 is extinguished and the circuit is interrupted across the switch arm 500 to the terminal 498. Then the sheet counter assembly 66 is set to register the desired number of copy sheets to be fed off the sheet feed tray 20 and the overchute feed table is loaded with the desired number of overchute copy sheets. The overchute copy sheets are placed between the slot 694 and the switch actuating arm 692 so that the actuating arm rests on top of the overchute sheets. This movement of the actuator arm away from the table bed opens the overchute switch.

With the duplicating machine set up for overchute feeding, the preduplicating control unit 34 is operated to control the machine normally during the preduplicating phase of operation and to initiate the normal duplicating phase. During the duplicating phase, the sheet feeding unit first feeds sheets from the overchute table through the duplicating machine. When the last copy sheet is fed from the overchute table, the switch actuating arm 692 drops back into the slot 694 and the overchute switch 676 is thereby closed. Current will now flow across the switch arm 678 to energize the counter clutch solenoid 108 and also to illuminate the light 440. Simultaneously, sheet feed from the sheet feeding tray 20 begins and the counter assembly 66 is brought into operation to count the copy sheets that are being fed off the paper stack by the sheet feeding unit. The counter assembly will then automatically terminate the duplicating phase of machine operation and program the machine into the postduplicating phase in the normal manner as previously described.

*Automatic operation without master eject*

In some instances, as in the case of metal lithographic masters and nonejectable paper masters, it is necessary to operate the duplicating machine 10 without ejecting the master automatically from the master cylinder 14. The duplicating machine is adapted to operate normally under the control of the programming circuit 300, on random run, or with the overchute feed table without automatically ejecting the lithographic master.

To operate the duplicating machine in any of these modes without automatic master ejection, the master eject switch (FIG. 7) is turned to the off position so that the circuit is broken to the terminal 306 of the master eject switch. This will deactivate the cam operated eject switch 178 so that the form off solenoid switch 400 cannot be energized and thereby renders it impossible to automatically eject a master from the master cylinder.

With the master eject switch 304 in the off position, current will flow across the switch arm 528 to the switch terminal 310 to maintain a holding circuit extending to the switch solenoid coil 332 of the pump solenoid switch 324, and also to the water solenoid 424. Then, at the end of the duplicating phase of operation when the feed handle 22 of the duplicating machine is actuated to turn off the machine feed, the lithographic master will not be ejected from the master cylinder 14. The form rollers will remain against the master preventing it from flapping and smearing the blanket cylinder as it is being washed in the post-duplicating phase, and etching solution will continue to be fed to the ink system to prevent the lithographic master from being smeared.

Returning to the master eject switch 304, it may additionally be noted that when the switch is placed in the off position, a circuit is completed across the switch to the switch contact 308. This electrically connects the solenoid switch contact 388d of the brake solenoid switch 388 to the form off solenoid 430, so that when the counter assembly 66 resets and the brake solenoid switch is energized at the end of the post-duplicating phase, current will flow across the brake solenoid switch contacts 388c–388d to energize the form off solenoid 430 and the brake solenoid 426 for the time delay period during which the brake solenoid switch is energized by the closure of the timing switch 450. The form off solenoid now moves the form rollers away from the master cylinder 14, but it is apparent that when the lithographic master is not automatically ejected from the master cylinder 14, the form rollers will be maintained in contact with the master until the termination of the postduplicating phase of machine operation.

*Manual operation*

In cases of electrical failure or when otherwise desirable, the electrical programming circuit 300 may be bypassed and the duplicating machine 10 may still be operated manually. To facilitate the manual operation of the duplicating machine, it is necessary that the pump motor switch 312 and the drive motor switch 334 be operative. With these switches operative, manual operation is possible and the pump motor 530 is first energized by switching the pump motor switch 312 to the manual position in FIGURE 7. This causes power from the power supply 302 to flow directly across the pump motor switch contact 318 to the pump motor 530.

After energizing the pump motor, a lithographic master may be loaded onto the master cylinder 14 and the control handle 34 of the preduplicating control unit 32 is then moved to the etch start position. With the control handle in the etch start position, the drive motor 530 is energized by switching the drive motor switch 334 to the manual position. This results in current flow from the power supply 302 across the contact 340 of the drive motor switch directly to the drive motor 514, and the drive motor will cause the master cylinder 14 to rotate. Etching fluid will then be applied to the lithographic master by the etch roller 30.

After several revolutions of the master cylinder 14, the lithographic master is properly coated with ink repellent etching solution and the control handle 34 is then sequentially moved to the image, ink, and feed positions to complete the mechanical functions normally accomplished by the control unit 32 during the preduplicating phase of operation of the duplicating machine. However, additional mechanical operations must be manually accomplished, and with the control handle in the ink position, form roll handles 51 and 53 in FIGURE 1, attached in a conventional manner to form rollers 52 and 54, must be manually moved to the form roll on position to bring the form rollers into contact with the master cylinder. Also, the function of the water on solenoid 424 must be manually performed to actuate the ductor lookout assembly for the water ductor roller 60 and permit the water ductor roller to move into contact with the oscillating roller 56 so that etch solution will be provided to the form rollers.

After the control handle 34 has been moved to the feed position to cause the feed lever 22 to initiate paper feeding through the duplicating machine 10, the desired number of copy sheets may be run through the duplicating machine. At the end of the duplicating phase when the feeding of a desired number of copies has been completed, the feed lever 22 may be manually turned to the off position to terminate paper feeding. Then the blanket wash roller is manually moved into contact with the blanket cylinder 16 to wash the image from the blanket cylinder.

The final steps in the manual operation of the duplicating machine 10 include returning the form rollers to the off position by manually turning the form roll handles 51 and 53 to the off position and subsequently deactivating the duplicating machine by moving the switches 312 and 334 to the off position. The manual duplicating run is now complete.

It will be readily apparent to those skilled in the art from a consideration of the drawings and the foregoing specification that the present invention includes a novel combination of components which may be operated effectively with a minimum degree of operator supervision to program an offset lithographic duplicating machine through a preduplicating, duplicating, and postduplicating phase of operation. The novel programming unit illustrated for use with the duplicating machine 10 insures efficient, trouble-free operation which is not normally attainable with conventional automated duplicating machines. The arrangement and types of components utilized within this invention may be subject to numerous modifications well within the purview of these inventors who intend only to be limited to a liberal interpretation of the specification and appended claims.

We claim:

1. In a duplicating machine having a rotatable master cylinder for receiving a master, duplicating means for operation during a duplicating cycle of said machine to reproduce an image from said master upon individual copy sheets passing through said machine, and postduplicating means for operation after said duplicating cycle to prepare said machine for a subsequent duplicating operation, a programming unit comprising a single mechanical counter for controlling both the duplicating and postduplicating cycles of said machine, means causing said counter to register the number of sheets passing through said machine during the duplicating cycle thereof, duplicating control means responsive to the sheet count registered by said counter to control said duplicating means, said duplicating control means operating upon the registration by said counter of a predetermined sheet count to cause said counter to discontinue registration of said sheet count and to activate means to cause said counter to subsequently continue counting until the registration of a second predetermined count, and postduplicating control means responsive to the number of counts registered by said counter after the termination of said sheet count, said postduplicating control means operating to control said postduplicating means.

2. In a duplicating machine having a rotatable master cylinder for receiving a master, duplicating means including a rotatable impression cylinder for operation during a duplicating cycle of said machine to reproduce an image from said master upon individual sheets passing through said machine, and postduplicating means for operation after said duplicating cycle to prepare said machine for a subsequent duplicating operation, a programming unit comprising a single counter having a single count registering means for controlling both the duplicating and postduplicating cycles of said machine, means causing said counter to register the number of sheets passing through said machine during the duplicating cycle thereof, duplicating control means responsive to the sheet count registered by said counter to control said duplicating means, said duplicating control means operating upon the registration by said counter of a predetermined count to cause said counter to discontinue registration of said sheet count and to activate means to cause said counter to subsequently register the number of cycles of rotation made by said impression cylinder, and postduplicating control means responsive to the number of cycles of rotation registered by said counter, said postduplicating control means operating to control said postduplicating means.

3. The programming unit of claim 2 wherein said counter constitutes a mechanically actuated mechanical counter.

4. In a duplicating machine having rotatable master and blanket cylinders and rotatable drive means for driving said master and blanket cylinders in timed relationship, a master cylinder braking unit for automatically stopping said master cylinder at the end of each duplicating run of said duplicating machine at substantially the same braking point in the rotational cycle thereof comprising power input means for said braking unit, said power input means operating to supply power to said braking unit at the end of each duplicating run of said duplicating machine, braking means connected to terminate the rotation of said master cylinder, said braking means including a hub mounted upon said drive means for rotation therewith and a brake band extending about said hub, actuator means connected to selectively tighten said brake band about said hub, said actuator means including an electrical solenoid mechanically linked to the ends of said brake band, and switching means electrically connected between said power input means and said electrical solenoid, said switching means including a magnetic switch actuator mounted upon said blanket cylinder for rotation therewith and a magnetically responsive switch unit mounted upon said duplicating machine adjacent a point in the rotational path of said switch actuator, said switch unit being closed to complete an electrical circuit between said power input means and said electrical solenoid during each cycle of rotation of the blanket cylinder when said magnetic switch actuator passes adjacent to said switch unit.

5. The master cylinder braking unit of claim 4 wherein said magnetic switch actuator is movably mounted for adjustment upon said blanket cylinder.

6. In a duplicating machine having a rotatable blanket cylinder, a rotatable master cylinder for receiving a master mounted for selective movement into and away from contact with said blanket cylinder, drive means for driving said master cylinder, electrically operated inking means for supplying ink to said master cylinder, electrically operated moistening means for supplying ink repellent solution to said master cylinder, a sheet feeding unit for feeding copy sheets through said duplicating machine, and duplicating control means for operating during the duplicating cycle of said machine to reproduce an image from said master upon individual copy sheets passing through said machine, a program control unit comprising a preduplicating control unit mounted upon said duplicating machine, said preduplicating control unit including a single manual operating means mounted thereon for selective movement to an etch, ink, image, and feed control position, a control assembly connected for movement by said manual operating means to said control positions, a plurality of switch means mounted adjacent said control assembly to be selectively actuated thereby, said switch means including a start switch connected to energize said master cylinder drive means positioned to be actuated by said control assembly in the etch-control position of said manual operating means, a form on switch connected to energize said electrically operated inking means positioned to be actuated by said control assembly in the ink position of said manual operating means, and a pump and water switch connected to energize said electrically operated moistening means positioned to be actuated by said control assembly in the image position of said manual operating means, and count registering means responsive to the feeding of copy sheets through said duplicating machine for controlling said duplicating control means.

7. The preduplicating control unit of claim 6 wherein a feed control means is connected between said sheet feeding unit and said control assembly, said feed control means being operative to actuate said sheet feeding unit to initiate sheet feeding through said duplicating machine when said manual control means is moved to the feed position.

8. In a duplicating machine having duplicating means operable during a duplicating cycle of said machine and postduplicating means operable after said duplicating cycle to prepare said machine for a subsequent duplicating operation, a programming unit comprising a counter assembly for controlling both the duplicating and postduplicating cycles of said machine including a single counter unit, said counter unit including count registration means, first count setting means to set said count registration means for a first predetermined count and second count setting means to set said count registration means for a second predetermined count, means operative to cause said counter unit to commence counting at the beginning of a duplicating cycle of said duplicating machine, and counter reset means operative to reset said counter unit, duplicating control means responsive to the first predetermined count registered by said count registration means to control said duplicating means, and postduplicating control means responsive to counts registered by said count registration means during said second predetermined count to control said postduplicating means, said postduplicating control means being operative upon the completion of said second predetermined count by said counter unit to cause said reset means to reset said counter unit.

9. The counter assembly of claim 8 wherein said count registration means includes a rotatable shaft, cam means fixed to said shaft for rotation therewith, and switch means mounted adjacent said shaft for actuation by said cam means at points in the rotational cycle of said shaft, said switch means being connected to control said duplicating and postduplicating control means.

10. The counter assembly of claim 9 wherein said switch means includes a plurality of switches positioned for actuation subsequent to the completion of said first predetermined count and a stop switch positioned for actuation at the end of said second predetermined count, said stop switch being movably mounted for selective positioning relative to said cam means by said second count setting means.

11. In a duplicating machine having a rotatable cylinder, duplicating means operable during a duplicating cycle of said machine, postduplicating means operable after said duplicating cycle to prepare said machine for a subsequent duplicating operation, and means for feeding copy sheets into said duplicating machine during the duplicating cycle, a programming unit comprising a counter assembly for controlling both the duplicating and postduplicating cycles of said machine including a single counter unit for counting the copy sheets fed into said duplicating machine during the duplicating cycle thereof and subsequently counting the cycles of rotation of said rotatable cylinder during the postduplicating cycle of said machine, said counter unit including count registration means, sheet count setting means to set said count registration means for a predetermined sheet count, and cycle count setting means to set said count registration means for a predetermined cycle count, counter drive means connected to drive said count registration means, said counter drive means being selectively responsive to either the feeding of a copy sheet through said duplicating machine or the rotation of said cylinder, and counter reset means operative to reset said counter unit, duplicating control means responsive to the sheet count registered by said count registration means to control said duplicating means, said duplicating control means being operative upon the completion of the predetermined sheet count by said counter unit to cause said counter drive means to drive said count registration means in response to the rotation of said rotatable cylinder, and postduplicating control means responsive to the cycle count registered by said count registration means to control said postduplicating means, said postduplicating control means being operative upon the completion of the predetermined cycle count by said counter unit to cause said reset means to reset said counter unit.

12. The combination of claim 11 wherein said duplicating machine includes means for mounting a master sheet on said rotatable cylinder, master eject means for ejecting said master sheet from said rotatable cylinder, a blanket cylinder, a liquid supply assembly for supplying fluid to the surface of said rotatable cylinder, said liquid supply assembly including ink supply means, ink repellent solution supply means, and form roller means to supply ink and ink repellent solution to said rotatable cylinder, air pump means for said duplicating machine, blanket wash means to clean said blanket cylinder, brake means to brake said rotatable cylinder, and preduplicating control means to activate said pump means, liquid supply assembly, counter drive means and sheet feeding means prior to the duplicating cycle of said duplicating machine, said duplicating control means operating upon the completion of said predetermined sheet count by said count registration means to deactivate said sheet feeding means, pump and ink repellent solution supply means prior to the registration of a first cycle count by said count registration means, and said postduplicating control means being sequentially operative in response to the registration of a first cycle count by said count registration means to activate said master eject means and deactivate said form roller means, in response to the registration of a second registered cycle count to activate said blanket wash means, and in response to the registration of said set predetermined cycle count to de-energize said blanket wash means and activate said cylinder brake means.

13. The counter assembly of claim 11 wherein said count registration means includes a rotatable shaft connected to said sheet count setting means, cam means fixed to said shaft for rotation therewith, switch means mounted adjacent said shaft for actuation by said cam means at points in the rotational cycle of said shaft, said switch means being connected to control said duplicating and postduplicating control means, and a ratchet gear fixed to said shaft, said ratchet gear cooperating with said counter drive to rotate said shaft.

14. The counter assembly of claim 13 wherein said switch means includes a plurality of switches positioned for actuation subsequent to the completion of said predetermined sheet count and a stop switch positioned for actuation at the end of said predetermined cycle count, said stop switch being movably mounted for selective positioning relative to said cam means by said cycle count setting means.

15. The counter assembly of claim 13 wherein said counter drive means includes pawl means for driving said ratchet gear, pawl actuator means for driving said pawl means to cause the registration of one count by said count registration means for each cycle of rotation of said rotatable cylinder, pawl latching means operative during the duplicating cycle of said duplicating machine to cause said pawl means to drive said ratchet gear to register one count for each copy sheet fed through said duplicating machine, while preventing the driving of said pawl means by said pawl actuator means in the absence of a copy sheet at said sheet feeding means, and latch control means operable to cause said pawl latching means to permit said pawl means to register one count for each cycle of rotation of said cylinder in the absence of a copy sheet at said sheet feeding means, said latch control means being connected for actuation by said duplicating control means at the end of the duplicating cycle of said duplicating machine.

16. In a duplicating machine having a rotatable master cylinder for receiving a master, a rotatable impression cylinder, means for operation during a preduplicating cycle of said machine to prepare said machine for a duplicating cycle thereof, duplicating means for operation during a duplicating cycle of said machine to reproduce an image from said master upon individual sheets passing through said machine, and postduplicating means for operation after said duplicating cycle to prepare said machine for a subsequent preduplicating cycle, an electromechanical programming unit comprising a single, manually operable control means operative to a pluurality of selective positions for controlling said preduplicating means, a single counter for controlling both the duplicating and postduplicating cycles of said machine, means responsive to movement of said manual control means to one of said positions for activating said counter and causing said counter to register the number of sheets passing through said machine during the duplicating cycle thereof, duplicating control means responsive to the sheet count registered by said counter to control said duplicating means, said duplicating control means operating upon the registration by said counter of a predetermined count to cause said counter to discontinue registration of said sheet count and to activate means to cause said counter to subsequently register the number of cycles of rotation made by said impression cylinder, and postduplicating control means responsive to the number of cycles of rotation registered by said counter, said postduplicating control means operating to control said postduplicating means.

17. In a duplicating machine having a rotatable master cylinder for receiving a master, power input circuit means for connecting said duplicating machine to an input power source, and a liquid supply assembly for supplying fluid for coating said master, said liquid supply assembly including a rotatable fluid transfer roller mounted upon said duplicating machine, a form roller and form roller positioning assembly for supplying liquid from said fluid transfer roller to said master comprising a plurality of form rollers positioned between said master cylinder and said fluid transfer roller, mounting means for said form rollers mounted upon said duplicating machine, said mounting means being adapted to move said form rollers relative to said master cylinder and said fluid transfer roller, night latch switching means connected in said power input circuit means, said night latch switching means being adapted to interrupt the power input circuit to said duplicating machine, and night latch control means mounted upon said duplicating machine for controlling said form rollers, said night latch control means including a rotatable cam shaft mounted upon said duplicating machine between said master, fluid transfer, and form rollers, said cam shaft being rotatable to an automatic on position, a form roll on position, and a night latch position, a plurality of cam means mounted upon said cam shaft for contacting and moving said form roller mounting means, said cam means being adapted to cause said form rollers to simultaneously contact said master and fluid transfer rollers in the form on position of said cam shaft, to contact said form roller mounting means to cause said mounting means to move the form rollers out of contact with said master cylinder while maintaining the form rollers in contact with said fluid transfer roller in the automatic on position of said cam shaft, and to contact said form roller mounting means to cause said mounting means to move said form rollers out of contact with said master cylinder and fluid transfer roller in the night latch position of said cam shaft, and switch actuator means mounted upon said cam shaft, said switch actuator means being positioned to contact said night latch switch in the night latch position of said cam shaft to break the input circuit to said duplicating machine.

18. The form roller and form roller positioning assembly of claim 17 wherein said night latch control means includes solenoid operating means operatively connected to said cam shaft, said solenoid operating means being operable to move said cam shaft between the automatic on and form on positions thereof, and solenoid control means connected between said solenoid operating means and said power input circuit means said solenoid control means being operable to energize said solenoid actuator means.

19. In a duplicating machine having a rotatable master cylinder, a master cylinder braking unit for stopping the rotation of said master cylinder at the end of each duplicating run of said duplicating machine, drive motor means operatively connected to drive said master cylinder, and a paper feed mechanism for feeding copy sheets through said machine during a duplicating run thereof, the combination comprising a programming unit including preset controller means for controlling the duration of a programmed duplicating run of said duplicating machine, stop control means responsive to said preset controller means at the end of the programmed run of said duplicating machine, said stop control means operative upon actuation by said preset controller means to terminate the operation of said drive motor means, brake control means energized by said stop control means upon the activation thereof by said preset controller means, said brake control means operating to activate said master cylinder braking unit, and a paper receiving assembly for alternately positioning copy sheets received from successive duplicating runs of said duplicating machine, said paper receiving assembly including a paper tray mounted upon said duplicating machine in position to receive copy sheets fed from said machine, said paper tray including paper receiving means mounted for travel between a plurality of paper receiving positions, and drive means connected to drive said paper receiving means, said drive means being connected to said stop control means when said paper tray is mounted upon said duplicating machine and operative upon actuation of said stop control means at the end of a duplicating run to shift said paper receiving means to a new paper receiving position.

20. In a duplicating machine having a rotatable master cylinder for receiving a duplicating master, master eject means for ejecting the master from said master cylinder, a rotatable blanket cylinder mounted adjacent said master cylinder, blanket cylinder washing means for cleaning said blanket cylinder, a rotatable impression cylinder, supply means for supplying ink and ink repellent fluid for coating said master, and a paper feed mechanism for feeding copy sheets through said duplicating machine during a duplicating run thereof, the combination comprising a programming unit having a single counter means for controlling both the duplicating and postduplicating cycles of said machine, said single counter means operating to count the copy sheets fed into said duplicating machine during the duplicating cycle thereof and to subsequently count the cycles of rotation of said impression cylinder during the postduplicating cycle of said machine, duplicating control means responsive to a predetermined sheet count registered by said counter means, said duplicating control means being operative upon the registration of said predetermined sheet count to simultaneously terminate the operation of said supply means and sheet feed mechanism while activating said master eject means, and a counter control means, said counter control means operating to cause said counter means to initiate a cycle count, and postduplicating control means operative in response to a first cycle count by said counter means to activate said blanket wash means and to a second predetermined cycle count to deactivate said blanket wash means.

21. In a duplicating machine having a rotatable master cylinder for receiving a duplicating master, master eject means for ejecting the master from said master cylinder, a rotatable blanket cylinder mounted adjacent said master cylinder, blanket cylinder washing means for cleaning said blanket cylinder, a rotatable impression cylinder, cylinder drive means for driving said cylinders, supply means for supplying ink and ink repellant fluid for coating said master, and a paper feed mechanism for feeding copy sheets through said duplicating machine during a duplicating run thereof, the combination comprising a preduplicating control unit mounted upon said duplicating machine, said preduplicating control unit including a single manual operating means mounted thereon for selective manual movement to a plurality of control positions, actuating means responsive to said manual operating means in said control positions to sequentially activate said cylinder drive means, supply means, and paper feed mechanism, a programming unit having a single counter means responsive to the feeding of copy sheets through said duplicating machine upon activation of said sheet feeding mechanism by said actuating means, said single counter means operating to count the copy sheets fed into said duplicating machine during the duplicating cycle thereof and to subsequently count the cycles of rotation of said impression cylinder during the postduplicating cycle of said machine, duplicating control means responsive to a predetermined sheet count registered by said counter means, said duplicating control means being operative upon the registration of said predetermined sheet count to simultaneously terminate the operation of said supply means and sheet feeding mechanism while simultaneously activating said master eject means and a counter control means, said counter control means operating to cause said counter means to initiate a cycle count, and postduplicating control means operative in response to a first cycle count by said counter means to activate said blanket wash means and to a second predetermined cycle count to deactivate said blanket wash means.

22. The combination of claim 21 which includes a master cylinder braking unit for automatically stopping said master cylinder at the end of each duplicating run of said duplicating machine at substantially the same braking point in the rotational cycle thereof, said master cylinder braking unit including braking means connected to terminate the rotation of said master cylinder and braking control means connected for actuation by said postduplicating control means at said second predetermined cycle count, said braking control means being operable to periodically actuate said braking means at the braking point in the rotational cycle of said master cylinder.

23. In a duplicating machine having a rotatable master cylinder for receiving a master, duplicating means for operation during a duplicating cycle of said machine to reproduce an image from said master upon individual copy sheets passing through said machine, and postduplicating means for operation after said duplicating cycle to prepare said machine for a subsequent duplicating operation, a programming unit comprising counting means for controlling both the duplicating and postduplicating cycles of said machine, counting control means for causing said counting means to register the number of sheets passing through said machine during the duplicating cycle thereof, duplicating control means responsive to the sheet count registered by said counting means to control said duplicating means, said duplicating control means operating upon the registration by said counting means of a first predetermined sheet count to cause said counting means to discontinue registration of said sheet count and to activate means to cause said counting means to subsequently continue counting until the registration of a second predetermined count, counter setting means for programming said first and second count into said counting means, postduplicating control means responsive to the number of counts registered by said counting means after the termination of said first sheet count, said postduplicating control means operating to control said postduplicating means, switch means connected to control said counting control means and operable to selectively deenergize said counting control means to prevent registration of said first predetermined sheet count by said counting means, and manually controlled end cycle switching means connected to selectively energize said postduplicating control means and initiate said second predetermined count when said first predetermined sheet count is not registered by said counting means.

24. The programming unit of claim 23 wherein end cycle safety switch means are connected to said end cycle switching means, said end cycle safety switch means being operable by said counter setting means to permit operation of said end cycle switching means.

25. In a duplicating machine having a rotatable blanket cylinder, a rotatable master cylinder mounted for selective movement into and away from contact with said blanket cylinder, mechanically and electrically actuated preduplicating means for operation during a preduplicating cycle of said machine, and a sheet feeding unit for feeding copy sheets through said duplicating machine, preduplicating control unit mounted upon said duplicating machine comprising a single manual operating means to control the activation of said mechanical and electrical preduplicating means, said manual operating means being mounted for selective movement to a plurality of control positions, electrical control means for controlling said electrically actuated preduplicating means, said electrical control means being operated by said manual operating means in selective control positions thereof, an etch roller operatively connected to said manual operating means, said etch roller being adapted for movement by said manual operating means into contact with said master cylinder when said manual operating means is placed in one of said control positions, master cylinder locking means mounted upon said preduplicating control unit and connected for operation by said manual operating means, said master cylinder locking means being caused to lock said master cylinder in contact with said blanket cylinder upon movement of said manual operating means to a second control position, and feed control means connected between said sheet feeding unit and said preduplicating unit, said feed control means being operated by movement of said manual operating means to a third control position to actuate said sheet feeding unit and cause the subsequent sheet feeding of copy sheets through said duplictaing machine.

26. The preduplicating control unit of claim 25 wherein a rotatable cam and linkage assembly is mounted upon said duplicating machine and connected to said manual operating means, said cam and linkage assembly being rotatable by said manual operating means to said control positions to selectively operate said master cylinder locking means and feed control means.

27. The preduplicating control unit of claim 26 wherein said electrical control means includes a plurality of switch means mounted adjacent said cam and linkage assembly, said switch means being positioned to be selectively activated by said cam and linkage assembly in specific control positions thereof to control said electrically actuated preduplicating means.

28. In a duplicating machine having a rotatable master cylinder for receiving a master, electrical and mechanical preduplicating means for operation during a preduplicating cycle of said machine to prepare said machine for a subsequent duplicating cycle, and duplicating means for operation during the duplicating cycle of said machine to reproduce an image from said master upon individual copy sheets passing through said machine, a program control unit comprising a preduplicating control unit mounted upon said duplicating machine, said preduplicating control unit including a single manual operating means mounted thereon for selective movement to a plurality of control positions, an etch roller operatively connected to said manual operating means, said etch roller being adapted for movement by said manual operating means into contact with said master cylinder when said manual operating means is placed in one of said control positions, and a control assembly connected for operation by said single manual operating means, said control assembly being movable by said manual operating means to each of said control positions to sequentially activate selected electrical and mechanical preduplicating means in each control position, and count registering means for controlling said duplicating means during the duplicating cycle of said duplicating machine, said count registering means being activated by said control assembly upon movement of said manual control means to a preselected control position.

29. The combination of claim 28 wherein said duplicating machine includes a blanket cylinder, drive means for driving said master cylinder, a sheet feeding unit for feeding copy sheets through said duplicating machine, a liquid supply assembly for supplying fluid to the surface of said master cylinder, said liquid supply assembly including ink supply means and ink repellant solution supply means and pump means for supplying air and vacuum to said duplicating machine, said single manual operating means being sequentially operable to a first control position wherein said etch roller contacts said master cylinder and said control assembly activates first selected electrical preduplicating means, said first selected electrical preduplicating means operating to energize said drive means, said program control unit and said count registering means; to a second control position wherein said manual operating means moves said etch roller away from contact with said master cylinder and said control assembly activates second selected electrical preduplicating means, said second selected electrical preduplicating means operating to energize said ink supply means to supply ink to said master cylinder; to a third control position wherein said control assembly activates third selected electrical preduplicating means and first selected mechanical preduplicating means, said third selected electrical preduplicating means operating to energize said ink repellant solution supply means to supply ink repellant solution to said master cylinder and said pump, said first selected mechanical preduplicating means operating to move said blanket cylinder into contact with said master cylinder; and to a fourth control position wherein said control assembly activates second selected mechanical preduplicating means, said second selected mechanical preduplicating means operating to disengage said master and blanket cylinders and actuate said sheet feeding unit.

30. In a duplicating machine having a rotatable master cylinder, a master cylinder braking unit for automatically stopping said master cylinder at the end of each duplicating run of said duplicating machine at substantially the same braking point in the rotational cycle thereof comprising power input means for said braking unit, said power input means operating to supply power to said braking unit at the end of each duplicating run of said duplicating machine, braking means connected to terminate the rotation of said master cylinder, actuator means connected to selectively activate said braking means, and switching means electrically connected between said power input means and said actuator means and responsive at the braking point in the rotational cycle of the master cylinder to permit power to flow from said input means to activate said actuator means when the master cylinder reaches such braking point at the end of a duplicating run, said switching means including a rotatable magnetic switch actuator means, said magnetic switch actuator means being adapted to complete one cycle of rotation for each cycle of rotation of said master cylinder, and a magnetically responsive switch unit mounted upon said duplicating machine adjacent a point in the rotational path of said switch actuator means, said switch unit being closed to complete an electrical circuit between said input means and said actuator means during each cycle of rotation of said master cylinder when said magnetic switch actuator passes adjacent to said switch unit.

31. In a duplicating machine having a rotatable master cylinder, a master cylinder braking unit for stopping the rotation of said master cylinder at the end of each duplicating run of said duplicating machine and drive motor means operatively connected to drive said master cylinder, a programming unit comprising preset controller means for controlling the duration of a programmed duplicating run of said duplicating machine, stop control means responsive to said preset controller means at the end of the programmed run of said duplicating machine, said stop control means operative upon actuation by said preset controller means to terminate the operation of said drive motor means, brake control means energized upon the activation of said stop control means connected between said stop control means and said master cylinder braking unit, said brake control means operating to activate said master cylinder braking unit, and reset means connected for energization by said stop control means, said reset means being operative upon the activation of said stop control means to reset said preset controller means.

32. The programming unit of claim 31 wherein said brake control means includes switching means responsive at a braking point in the rotational cycle of said master cylinder, said switching means being operative at such braking point to complete a power input circuit to said master cylinder braking unit.

33. In a duplicating machine operative to individually discharge in sequence copy sheets during each duplicating run thereof, a paper receiving assembly mounted upon said duplicating machine for stacking all copy sheets received from each successive duplicating run differently from the sheets received from the next preceding run comprising a single paper receiving tray having a sheet receiving platform, substantially parallel side members extending upwardly from said platform along either side thereof, and a front stop extending upwardly from said platform at one end thereof, mounting means for mounting said paper receiving tray for movement between at least two paper receiving positions, said paper receiving tray operating in each such paper receiving position to directly receive and support said sheets moving in a fixed, unaltered discharge direction from said duplicating machine so as to form a sheet stack resting against said front stop and at least one of said side members, each subsequently received sheet in said sheet stack overlying the next preceding sheet discharged, normally inactive drive means operatively connected to said paper receiving tray, and control means operable upon completion of each duplicating run to activate said drive means to move said paper receiving tray from one paper receiving position to another, whereby the sheet stack formed on said paper receiving tray during a succeeding duplicating run will rest upon the stack formed during the next preceding run but be offset therefrom.

34. The paper receiving assembly of claim 33 wherein said mounting means includes a support, a pivot pin extending between said support and said paper receiving tray for mounting said paper receiving tray in spaced relationship above said support, said pivot pin being nonrotatably secured to said paper receiving tray and mounted for rotation relative to said support.

35. The paper receiving assembly of claim 34 wherein said pivot pin is secured to said paper receiving tray at a point substantially along the central longitudinal axis of copy sheets received in said paper receiving tray whereby said paper receiving tray is caused to shift about the central longitudinal axis of copy sheets received therein.

36. The paper receiving assembly of claim 34 wherein said drive means includes a driving motor secured to said support, said driving motor being connected for energization by said control means, and a linkage connected between said driving motor and said paper receiving tray, said linkage operating upon energization of said driving motor to drive said paper receiving tray from one paper receiving position to another.

37. The paper receiving assembly of claim 36 wherein said linkage means includes a rotatable cam secured to said driving motor, said cam being positioned between said paper receiving tray and said support, a first elongated link having one end pivotally connected to a pivot point on said rotatable cam, the opposite end of said first link being pivotally connected to one end of a second elongated link, and the opposite end of said second link being nonpivotally secured to said pivot pin.

38. The paper receiving assembly of claim 37 wherein drive means includes switching means connected between said driving motor and said control means, said switching means being operable by said cam to terminate the energization of said driving motor by said control means when said paper receiving tray has been moved from one to another of said paper receiving positions.

39. The paper receiving assembly of claim 37 wherein said drive means includes switching means connected between said driving motor and said control means, said switching means being operative to terminate the energization of said driving motor by said control means, and switch actuator means connected to be driven by said driving motor, said switch actuator means operating to actuate said switching means to de-energize said driving motor when said paper receiving tray has been moved from one to the other of said paper receiving positions.

40. In a duplicating machine having a paper feed mechanism for feeding copy sheets through said machine during a duplicating run thereof, a programming unit including preset controller means for controlling the duration of said duplicating run, the combination comprising a paper receiving assembly mounted upon said duplicating machine for stacking all copy sheets received from each successive duplicating run of said duplicating machine differently from the sheets received from the next preceding run comprising a single paper receiving tray having a sheet receiving platform, substantially parallel side members extending upwardly from said platform along either side thereof, and a front stop extending upwardly from said platform at one end thereof, mounting means for removably mounting said paper receiving tray upon said duplicating machine, said mounting means mounting said paper receiving tray for movement between at least two paper receiving positions, said paper receiving tray operating in each such paper receiving position to directly receive and support sheets moving in a fixed, unaltered discharged direction from said duplicating machine so as to form a sheet stack resting against said front stop and at least one of said side members, each subsequently received sheet in said sheet stack overlying the next preceding sheet discharged, normally inactive drive means operatively connected to said paper receiving tray, and control means connected to said duplicating machine and responsive to said preset controller means at the end of each controlled duplicating run of said duplicating machine, said control means operating in response to said preset controller means to activate said drive means to move said paper receiving tray from one paper receiving position to another whereby the sheet stack formed upon said paper receiving tray during the succeeding duplicating run will rest upon the stack formed during the next preceding run but be offset therefrom.

41. The paper receiving assembly of claim 40 wherein said control means includes a drive motor power source connected to said switching means and an electrically operated switch means connected between said power source and said driving motor, said electrically operated switch means being adapted to be energized during reception thereby of a control signal to complete a circuit between said power source and said driving motor.

42. In a duplicating machine having a rotatable master cylinder for receiving a master and a liquid supply assembly for supplying fluid to the surface of said master, said liquid supply assembly including a rotatable fluid transfer roller mounted upon said duplicating machine, a form roller and form roller positioning assembly for supplying fluid from said fluid transfer roller to said master comprising a plurality of form rollers positioned between said master cylinder and said fluid transfer roller, mounting means for said form rollers mounted upon said duplicating machine, said mounting means being adapted to move said form rollers relative to said master cylinder and said fluid transfer roller, a night latch control means mounted upon said duplicating machine for controlling said form rollers; said night latch control means including a cam shaft rotatably mounted upon said duplicating machine between said master cylinder, fluid transfer roller, and form rollers, cam means mounted upon said cam shaft, and slidable link means movably mounted for actuation by said cam means, said cam shaft being movable to a first position to cause said form rollers to simultaneously contact said master cylinder and said fluid transfer roller; to a second position in which said cam means drives said link means into contact with said form roller mounting means to cause said mounting means to move said form rollers out of contact with the master cylinder while maintaining contact between said form rollers and fluid transfer roller; and to a night latch position to cause said cam means to contact said form roller mounting means and cause said mounting means to move said form rollers out of contact with both said master cylinder and fluid transfer roller.

References Cited
UNITED STATES PATENTS

| | | | |
|---|---|---|---|
| 1,991,962 | 2/1935 | Schultz | 101—148 |
| 2,133,189 | 10/1938 | Dalton | 93—93.3 |
| 2,645,174 | 7/1953 | Levin | 101—132 |
| 2,756,672 | 7/1956 | George | 101—144 |
| 2,813,484 | 11/1957 | Pratt | 101—144 |
| 2,868,456 | 1/1959 | King | 191—247 X |
| 2,916,988 | 12/1959 | Cragg | 101—144 |
| 2,977,874 | 4/1961 | Ritzerfeld et al. | 101—145 |
| 3,034,427 | 5/1962 | Ostwald | 101—144 |
| 3,056,346 | 10/1962 | Gammeter et al. | 101—144 |
| 3,102,470 | 9/1963 | Cragg et al. | 101—144 |
| 3,264,981 | 8/1966 | Burger et al. | 101—144 |
| 2,958,274 | 11/1960 | Ritzerfeld et al. | 101—145 |
| 3,153,380 | 10/1964 | Gericke | 101—142 |
| 3,279,371 | 10/1966 | Mestre | 101—352 |
| 3,294,019 | 12/1966 | Taylor | 101—144 |
| 3,303,778 | 2/1967 | Tonkin et al. | 101—144 |
| 748,148 | 12/1903 | MacDowell et al. | 270—58 |
| 925,175 | 6/1909 | Hallam | 93—93 |

ROBERT E. PULFREY, *Primary Examiner.*

EDGAR S. BURR, *Assistant Examiner.*